United States Patent
Messmer

(10) Patent No.: US 8,891,934 B2
(45) Date of Patent: Nov. 18, 2014

(54) VIDEO DISPLAY CONTROL USING EMBEDDED METADATA

(75) Inventor: Neil W. Messmer, Langley (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 152 days.

(21) Appl. No.: 13/580,051

(22) PCT Filed: Feb. 17, 2011

(86) PCT No.: PCT/US2011/025185
§ 371 (c)(1),
(2), (4) Date: Aug. 20, 2012

(87) PCT Pub. No.: WO2011/103258
PCT Pub. Date: Aug. 25, 2011

(65) Prior Publication Data
US 2012/0321273 A1 Dec. 20, 2012

Related U.S. Application Data

(60) Provisional application No. 61/306,900, filed on Feb. 22, 2010.

(51) Int. Cl.
*H04N 5/77* (2006.01)
*G11B 27/00* (2006.01)
*H04N 11/00* (2006.01)
*G11B 27/031* (2006.01)
*H04N 7/025* (2006.01)
*H04N 7/08* (2006.01)
*H04N 9/82* (2006.01)
*H04N 13/00* (2006.01)
*H04N 21/235* (2011.01)
*H04N 21/435* (2011.01)
*H04N 21/84* (2011.01)
*H04N 21/845* (2011.01)

(52) U.S. Cl.
CPC .............. *G11B 27/031* (2013.01); *H04N 7/025* (2013.01); *H04N 7/08* (2013.01); *H04N 9/8205* (2013.01); *H04N 13/0022* (2013.01); *H04N 13/0048* (2013.01); *H04N 13/0066* (2013.01); *H04N 21/235* (2013.01); *H04N 21/435* (2013.01); *H04N 21/84* (2013.01); *H04N 21/845* (2013.01)
USPC ............................ 386/224; 386/278; 348/461

(58) Field of Classification Search
CPC ....... G11B 27/031; H04N 7/025; H04N 7/08; H04N 13/0062; H04N 13/0066; H04N 13/0048; H04N 21/84; H04N 21/235
USPC .................................................. 386/278–290
See application file for complete search history.

(56) References Cited

U.S. PATENT DOCUMENTS 8,024,632 B1 * 9/2011 Konrad .......................... 714/733
2003/0048851 A1 3/2003 Hwang
(Continued)

FOREIGN PATENT DOCUMENTS

EP 1501316 1/2005
EP 2068566 6/2009
(Continued)

OTHER PUBLICATIONS

Digital Video Broadcasting (DVB), "Specification for the Use of Video and Audio Coding in DVB Services delivered directly over IP Protocols", Mar. 27, 2006, pp. 1-46.
(Continued)

*Primary Examiner* — Thai Tran
*Assistant Examiner* — Stephen Smith

(57) ABSTRACT

In a system comprising capture, post production, any known video delivery channel, decoding and display subsystems, an apparatus and method are provided for generating, editing, delivering, processing and displaying video data to preserve the video creator's creative intent. Reference display metadata, used to guide the subsequent processing and display of the video data, is dynamically generated at the post-production stage and embedded into the video data.

14 Claims, 11 Drawing Sheets

(56) References Cited

U.S. PATENT DOCUMENTS

| | | | |
|---|---|---|---|
| 2004/0186735 A1* | 9/2004 | Ferris et al. | 704/500 |
| 2004/0249861 A1* | 12/2004 | Hoshino et al. | 707/104.1 |
| 2005/0086702 A1 | 4/2005 | Cormack | |
| 2005/0220322 A1* | 10/2005 | Olesen et al. | 382/100 |
| 2005/0248561 A1* | 11/2005 | Ito et al. | 345/419 |
| 2006/0072780 A1* | 4/2006 | Zarrabizadeh | 382/100 |
| 2006/0092038 A1 | 5/2006 | Unger | |
| 2006/0153572 A1 | 7/2006 | Champion | |
| 2007/0050807 A1 | 3/2007 | Yeo | |
| 2007/0211074 A1* | 9/2007 | Yeung | 345/604 |
| 2007/0257923 A1 | 11/2007 | Whitby-Strevens | |
| 2007/0268411 A1* | 11/2007 | Rehm et al. | 348/650 |
| 2007/0291179 A1* | 12/2007 | Sterling et al. | 348/642 |
| 2008/0162141 A1 | 7/2008 | Lortz | |
| 2008/0187028 A1 | 8/2008 | Lida | |
| 2010/0100971 A1* | 4/2010 | Geyzel et al. | 726/32 |
| 2011/0154426 A1* | 6/2011 | Doser et al. | 725/118 |

FOREIGN PATENT DOCUMENTS

| | | |
|---|---|---|
| WO | 03058946 | 7/2003 |
| WO | 2008059393 | 5/2008 |
| WO | 2009095732 | 8/2009 |
| WO | 2010103012 | 9/2010 |
| WO | 2010/104624 | 10/2010 |
| WO | 2011/103075 | 8/2011 |

OTHER PUBLICATIONS

Digital Video Broadcasting (DVB), "3D Switch Signaling", Jan. 27, 2010, pp. 11-12.

Narasimhan, Sam, et.al., "WD of ISO/IEC 13818-1:2007/AMD 7 Signaling of Stereoscopic Video in MPEG-2 Systems", Oct. 28, 2012.

Anonymous, "3DTV Solutions: FullDepth 3D Vision and Stereoscopic Vision and Engineering", Jan. 1, 2010, retrieved Mar. 2, 2011 from [https://www.3dtvsolutions.com/en/technology].

Jung, S. et al., "Fingerprint Watermarking for H.264 Streaming Media" Frontiers in the Convergence of Bioscience and Information Technologies 2007 IEEE, pp. 671-675.

Swanson, M.D., Bin Zhu "Data Hiding for Video-in-Video" Image Processing, 1997, Proc. International Conference, Oct. 26-29, 1997, vol. 2, pp. 676-679.

Wolf, Wayne, "Embedded Software for Video" Lecture Notes in Computer Science, 2001, vol. 2211/2001, 493-502.

* cited by examiner

VIDEO DISPLAY CONTROL USING EMBEDDED METADATA

CROSS-REFERENCE TO RELATED APPLICATIONS

This application claims priority to U.S. priority patent application No. 61/306,900 filed 22 Feb. 2010, which is hereby incorporated by reference in its entirety.

TECHNICAL FIELD

This invention relates to systems, apparatus and methods for delivering video data and/or controlling display of video data. Some embodiments provide systems, apparatus and methods for delivering other data in a stream of video data. Some embodiments provide systems, apparatus and methods for generating, delivering, processing and displaying video data to preserve the video creator's creative intent.

BACKGROUND

FIG. 1 is a flowchart of a conventional video delivery pipeline 100 showing various stages from video capture to video content display. A sequence of video frames 101 is captured at block 102. Video frames 101 may be digitally captured (e.g. by a digital camera) or generated by a computer (e.g. using computer animation) to provide a stream of video data 103. Alternately, video frames 101 may be captured on film by a film camera. The film is converted to a digital format to provide a stream of video data 103.

Video data 103 is provided to a processor at block 104 for post-production editing. Block 104 post-production editing may include adjusting or modifying colors or brightness in particular areas of an image to enhance the image quality or achieve a particular appearance for the image in accordance with the video creator's creative intent. Other editing (e.g. scene selection and sequencing, image cropping, addition of computer-generated visual special effects, etc.) may be performed at block 104. During block 104 post-production editing, video images are viewed on a reference display.

Following post-production, video data 103 is delivered at block 106 to a display subsystem. As seen in FIG. 1A, block 106 delivery includes an encoder stage 107A for driving broadcast or transmission of video data 103 over a video distribution medium 105 (e.g. satellite, cable, DVD, etc). A decoder stage 107B is located at the display end of block 106 to decode video data 103 transmitted over medium 105. The display subsystem may include a video processor and a display. At block 108, video data 103 is provided to the video processor for processing and/or decoding. Video data 103 is output to the display at block 110 to display a sequence of images to a viewer.

To improve the quality of the displayed images, video data 103 may be driven through video delivery pipeline 100 at a relatively high bit rate so as to facilitate an increased bit depth for defining RGB or chroma values for each chrominance (color) channel. For example, a stream of video data 103 may comprise 8, 10 or 12 bits of data for each chrominance channel of a pixel.

Despite using a high bit depth for each chrominance channel, variations in display characteristics (such as luminance range, gamut, etc.) may affect the appearance of an image rendered on a display so that the image rendered does not match the creative intent of the video's creator. In particular, the perceived color or brightness of an image rendered on a particular display subsystem may differ from the color or brightness of the image as viewed on the reference display during block 104 post-production editing.

Moreover, methods applied at processing or display stages of a conventional video delivery pipeline, such as those stages represented by blocks 104, 108 and 110 of video delivery pipeline 100 (FIG. 1), are typically performed in a pre-configured manner without taking into account processing which may have occurred at other stages of video delivery pipeline 100. For example, the block 110 methods for displaying video data 103 may be performed without knowledge of how prior processing steps in video delivery pipeline 100 were carried out, such as block 104 post-production editing. The block 110 display methods may not be suitable for rendering an image on the display in a manner which preserves the video creator's creative intent, as determined by block 104 post-production editing.

There is a general desire for systems, apparatus and methods for generating, delivering, processing and displaying video data to preserve the video creator's creative intent. There is a general desire for systems, apparatus and methods for providing information which may be used to guide downstream processing and/or display of video data.

SUMMARY

Systems, apparatus and methods are provided for providing video data including metadata to a display subsystem. The video data may be transmitted or provided to the display subsystem using systems, apparatus and methods suitable for the type of content delivery (e.g. television broadcast over satellite, cable, or high-definition networks; streaming multimedia over IP or wireless networks; playback from DVD or other storage media, etc.). In particular embodiments, metadata is generated and embedded in the video data at one or more stages of a video delivery pipeline. The metadata may provide information relating to: characteristics of a reference display used to edit the video data, characteristics of the environment in which the reference display is situated, characteristics of the edited image (e.g. luminance and gamut), characteristics of the viewing environment in which the display of the display subsystem is situated, etc.

The metadata is delivered with the video data to downstream apparatus such as a display subsystem. The metadata may be delivered and received by the downstream apparatus in advance of a video frame for which the embedded metadata is to be applied. The metadata may be extracted and decoded at the display subsystem and applied to configure a display of the display subsystem and/or to process the video data to adjust the video data for the display.

In certain embodiments, the metadata may be embedded in the video data by overwriting a plurality of guard bits in the video data. In other embodiments, the metadata may be embedded in the video data by overwriting a plurality of least significant bits in the video data, such as least significant bits of chrominance channels. Other types of data may be embedded in the video data using the methods described herein.

Methods of encoding the metadata are provided so as to avoid unintentional communication of reserved video words (e.g. reserved pixel values) and/or reserved metadata words (e.g. start or end of frame headers). In embodiments where the guard bits are overwritten with metadata, the plurality of video data bits preceding a guard bit may be compared to reserved video words to determine whether the guard bit should contain a guard; otherwise, a bit of metadata may be embedded in the guard bit.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
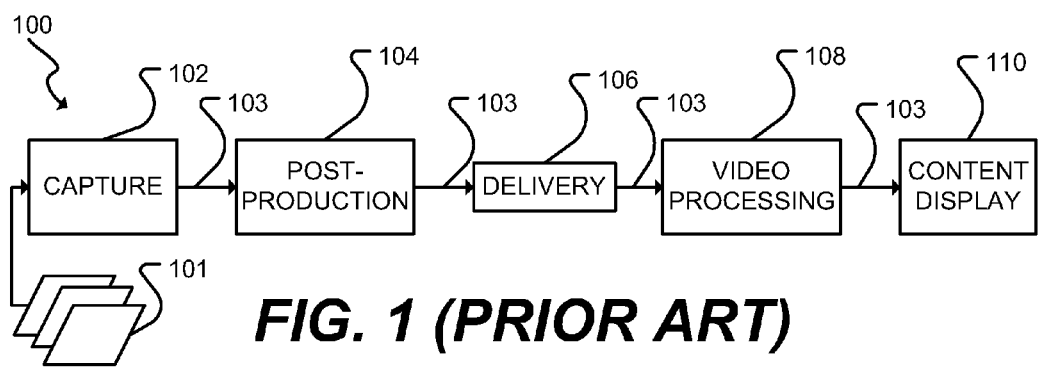
FIG. 1 is a flowchart illustrating the stages of a conventional video delivery pipeline.
Figure 1A:
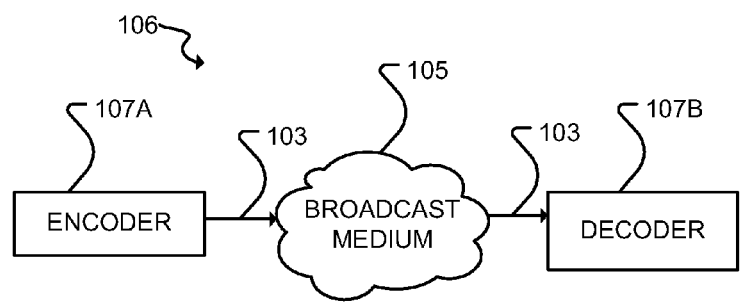
FIG. 1A is a flowchart illustrating the stages of delivery of video data that may be performed in the FIG. 1 video delivery pipeline.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Example embodiments provide for systems, apparatus and methods useful in a video delivery pipeline. Metadata is written in video data and transmitted with the video data through the video delivery pipeline. The metadata may, for example, be useful for guiding downstream devices in processing video data and/or guiding video playback on a display. The display may be a flat panel display (e.g. LCD, LED, OLED, high-dynamic range, or plasma display) such as may be provided in a television, computer monitor, laptop, cellular phone or handheld mobile device, and the like, or any other display capable of displaying video data.

Metadata may be dynamically generated and written or embedded in the video data stream at various stages throughout the video delivery pipeline including video capture, post-production editing, and pre-display processing. The metadata may define parameters, including, for example: gamut and other characteristics of a reference display used in post-production editing, location of light sources in an image, protected colors of an image which should not be altered, etc. Such metadata may be decoded and processed by a decoder and/or a display and used for processing of video data and/or display management and configuration to control and enhance video playback on the display. Metadata may be used to control a display (and/or process video data for the display) to display video in a manner which preserves the video creator's creative intent.

According to particular embodiments, video data may include guard bits and/or least significant bits (LSBs) such as LSBs of chrominance channels. In some embodiments, metadata is carried in the guard bits and/or LSBs. For video formats such as VDR format (see FIG. 2A), a video data frame 10 may include one or more guard bits 11. Metadata 225 may be written in at least some of the guard bits 11. For other video formats such as a non-VDR format (see FIG. 2B), a video data frame 10 may include one or more LSBs 12 (e.g. LSBs 12 in each of the chrominance or luminance channels). Metadata 225 may be written in at least some of the LSBs 12. The Human Vision System (HVS) tends to be less sensitive to changes in chromaticity than changes in luminance. Therefore, given this HVS characteristic, in some embodiments metadata 225 may be written in an LSB 12 in one or more of the chrominance channels. Bits of metadata 225 may be serialized onto guard bits 11 and/or LSBs 12 within video data frames 10 to provide packets of metadata 225 of variable or fixed length. VDR format is a video format described in co-owned PCT Application No. PCT/US2010/022700 for "EXTENDED DYNAMIC RANGE AND EXTENDED DIMENSIONALITY IMAGE SIGNAL CONVERSION AND/OR DELIVERY VIA LEGACY VIDEO INTERFACES" which is herein incorporated by reference.

For video data in non-VDR or other formats having LSBs (e.g. LSBs of chrominance channels), metadata may be written in the LSBs in one of the following ways, for example:

Metadata may be written in the LSB of each chrominance channel, such that all LSBs potentially carry metadata.

Metadata may be written in round-robin fashion in the LSB of each chrominance channel or in some other manner which skips some LSBs, so that not all LSBs potentially carry metadata.

Metadata may be written in LSBs of chrominance channels of pixels in areas of the image which have a relatively reduced tendency to be affected by overwriting the LSBs. For example, in some embodiments, metadata may be written in the LSBs of chrominance channels of pixels in brighter image areas to take advantage of the general tendency that changes in the displayed image caused by overwriting the LSB are less noticeable in brighter image areas.

In certain embodiments, a method of writing metadata in LSBs may be selected to account for a possible loss of image quality in video content display which may result from overwriting the LSB of each chrominance channel (or other types of data) to carry metadata. Methods of writing metadata may be selected based on the video data or image so as to reduce or minimize artifacts in the displayed image.

As a variable amount of metadata may be transmitted through the video delivery pipeline for each video frame, methods and apparatus may be provided to manage the timing of delivery and processing of the metadata. For example, a metadata payload spanning a plurality of video frames may be transmitted to and received by a video decoder or processor in advance of processing of the particular video frame at which the metadata is to be applied. The metadata payload may be sent with a timestamp indicating when the metadata is to be applied by the video decoder or processor to manage or configure the display.

A metadata payload may be assigned a priority level. Systems, apparatus and/or methods may be provided so that metadata categorized as relatively higher priority metadata may be delivered prior to delivery of metadata categorized as relatively lower priority metadata. Such systems, apparatus and/or methods may be used to manage metadata delivery where there is insufficient bandwidth in the video delivery pipeline to transmit all of the metadata generated for one or more video frames. In particular embodiments, transmittal of certain metadata through the video delivery pipeline may be temporarily interrupted to allow transmittal of other metadata categorized as relatively higher priority metadata.

Other transport mechanisms may be provided to carry additional metadata. For example, in some video formats, video data includes chrominance data which is represented separately from luminance data. Some embodiments provide bursts of metadata through the video delivery pipeline, by overwriting chrominance data for particular video frames or areas of video frames with metadata. For pixels for which the luminance level is zero or below a threshold value, chrominance data may be overwritten with bits of metadata 225 without substantially affecting the appearance of the displayed image. Metadata may be written in chrominance portions or chrominance channels of video data which may include fields, values, bits, etc. FIG. 2C shows chrominance portions comprising series of bits 13 in data frames 10, which may be overwritten with metadata 225. Encoding of metadata in chrominance portions is described in a co-owned, co-pending application entitled SYSTEMS, APPARATUS AND METHODS FOR VIDEO DELIVERY AND CONTROLLING VIDEO DISPLAY BY OVERWRITING VIDEO DATA, which is incorporated herein by reference.

Figure 3:
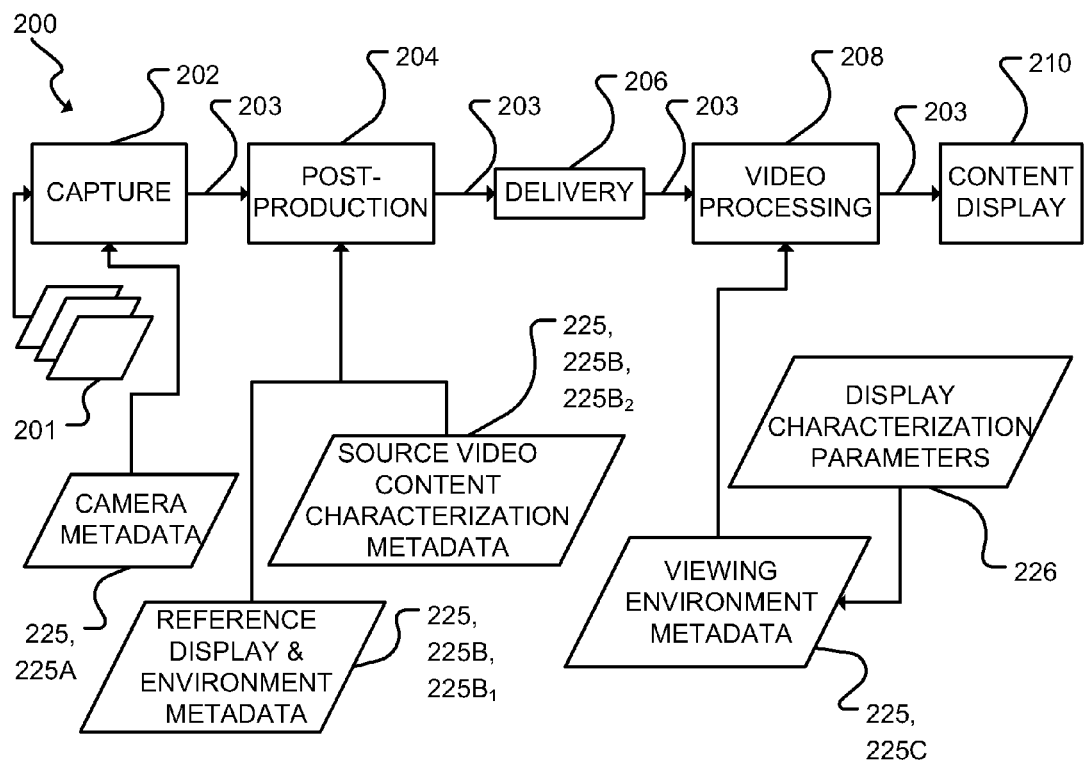
FIG. 3 is a flowchart illustrating the flow of video data through a video delivery pipeline and a method of generating, delivering, processing and displaying video data according to one embodiment to preserve the video creator's creative intent.

FIG. 3 is a flowchart showing the flow of data through a video delivery pipeline 200 according to a particular embodiment. Video delivery pipeline 200 incorporates similar stages as those depicted in video delivery pipeline 100 of FIG. 1, and accordingly, similar reference numerals are used to identify the similar stages, except that in video delivery pipeline 200 of FIG. 3, the reference numerals begin with a "2" instead of a "1". At one or more stages of video delivery pipeline 200, metadata 225 may be generated and embedded in a stream of video data 203 for use at a downstream stage. Metadata 225 is transmitted along with video data 203 through video delivery pipeline 200 to guide downstream devices in processing the video data and/or to guide video playback at a display subsystem at block 210. Video data 203, including embedded metadata 225, may be delivered to the display subsystem at block 206 using systems, apparatus and methods suitable for the type of video content delivery (e.g. television broadcast over satellite, cable, or high-definition networks; streaming multimedia over IP or wireless networks; playback from DVD or other storage media, etc.).

In the FIG. 3 embodiment, camera metadata 225A is generated and embedded in video data 203 at block 202. Camera metadata 225A may be generated based on the camera settings and video frame capture environment. Camera metadata 225A may comprise, for example, camera parameters which provide a snapshot of the camera settings during video frame capture. Such camera parameters may include aperture (f-stops), lens, shutter speed, sensitivity (ISO ratings) and the like. These camera parameters may be used to guide subsequent steps in video delivery pipeline 200, such as color adjustments (e.g. color timing) during post-production editing at block 204, or display configuration at block 210.

At block 204, post-production metadata 225B is generated and embedded in video data 203. Post-production metadata 225B may include: reference display and environment metadata $225B_1$ and source video content characterization metadata $225B_2$. Post-production metadata 225B may be used to guide subsequent steps in video delivery pipeline 200, such as display configuration at block 210.

Reference display and environment metadata $225B_1$ may describe the reference display configuration and studio or viewing environment used in the block 204 post-production editing. For example, with respect to the reference display used to display video data 203 during the block 204 post-production editing, reference display and environment metadata $225B_1$ may include parameters such as:

- a 3D color gamut mapping describing the tone and gamut boundaries of the reference display at a detailed resolution;
- a reduced set of parameters defining the tone and gamut boundaries of the reference display (which may be used to estimate a 3D color gamut mapping);
- system tonal response parameters describing the tonal response of the reference display for each chrominance channel;
- and/or the like.

Reference display and environment metadata $225B_1$ may also include parameters describing the studio environment in which video content was color-timed or edited on a reference display during the block 204 post-production editing. Such parameters may include ambient luminance and ambient color temperature.

Source video content characterization metadata $225B_2$ may describe post-production edited video content including information which may identify or provide:

- a location map of light sources in an image, or of reflective or emissive objects in an image;
- gamut of the video source content;
- areas of an image which are color-timed purposely out of gamut of the reference display;
- protected colors that should not be altered during pre-display processing by the video processor or during display configuration;
- an image histogram characterizing the image in terms of luminance or gamut (for example, such information may be used by downstream devices to determine average luminance to refine tone and gamut mapping);

a scene change or reset flag, to alert downstream devices that any statistics or hysteresis from previous video frames are no longer valid;

a motion map characterizing the video content to identify objects in motion, which may be used by downstream devices in combination with the light source location map to guide tone and gamut mapping;

an indication of the source of color-timed content (e.g. direct from the camera, or post-production editing);

director's creative intent settings which may be used to control downstream devices such as a decoder/television or other display. For example, such settings may include: display mode control providing the ability to control the display to operate in a particular mode (e.g. vivid, cinema, standard, professional, etc.); content type (e.g. animation, drama, sports, games, etc.) which may be used to determine an appropriate gamut or tone mapping or the like; tone mapping (e.g. customized tone mapping parameters or curves which may be used to guide tone expansion at the display); and gamut mapping (e.g. customized gamut mapping parameters which may be used to guide gamut expansion at the display);

and/or the like.

Figure 3A:
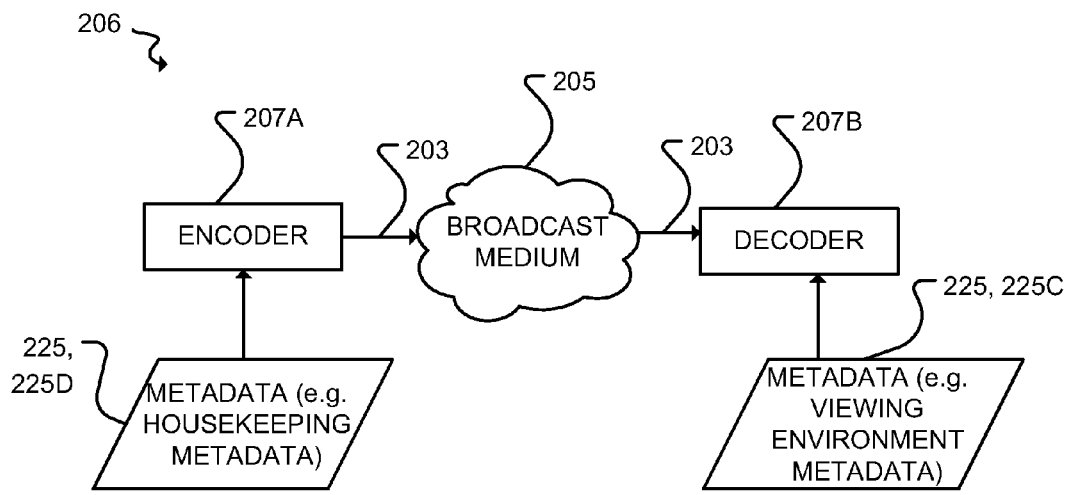
FIG. 3A is a flowchart illustrating the stages of delivery of video data that may be performed in the FIG. 3 video delivery pipeline.

Video data 203 is delivered to a display subsystem at block 206. As seen in FIG. 3A, block 206 delivery may include an encoder stage 207A for driving distribution, broadcast or transmission of video data 203 over a video distribution medium 205 such as satellite, cable, or high-definition networks; IP or wireless networks; or DVD or other storage media, etc. A decoder stage 207B may be provided at the display end of block 206 to decode video data 203 distributed over medium 205. Decoder stage 207B may be implemented by a set-top box, for example, or by a decoder within the display subsystem. At blocks 206 and/or 208, viewing environment metadata 225C and/or other metadata 225 may be embedded in video data 203. Viewing environment metadata 225C may comprise, for example:

Advanced Video Coding (AVC) VDR encoder data providing reference monitor tone mapping or gamut curves or ambient luminance of the reference environment. At least some of this information may be determined at the decoder stage 207B (or by the video processor) with knowledge of the display characteristics (e.g. by reading the Extended Display Identification Data (EDID) of the display) and environment of the display subsystem. In some embodiments, at least some of this information may be determined at the studio during post-production processing of the video data.

Parameters describing the environment in which the display of the display subsystem is situated. Such parameters may include, for example, ambient luminance and/or tone or color temperature.

Viewing environment metadata 225C may be used to guide processing of video data at block 208 and/or display configuration at block 210.

The display subsystem comprises a video processor for processing incoming video data 203 at block 208. The video processor of the display subsystem may perform signal processing on video data 203 based on metadata 225 extracted from video data 203 (e.g. metadata 225A) and/or known display characteristics associated with the display of the display subsystem. Video data 203 may be processed and adjusted for the display in accordance with display characterization parameters 226 and/or metadata 225.

Other metadata 225 that may be embedded in video data 203 at blocks 206 and/or 208, or at other stages of video delivery pipeline 200, includes housekeeping metadata 225D (for managing distribution rights and the like) such as, for example:

watermarking data indicating where the video content was generated, distributed, modified, etc.;

fingerprinting data providing a description of the video content for searching or indexing purposes, and the like;

protection data indicating who owns the video content and/or who has access to it;

and/or the like.

Viewing environment metadata 225C may be generated based at least in part on display characterization parameters 206 associated with the display of the display subsystem. In some embodiments, viewing environment metadata 225C, source video content characterization metadata $225B_2$ and/or housekeeping metadata 225D may be created or provided by analysis of video data 103 at the encoder stage 207A, the decoder stage 207B and/or by the video processor at block 208.

At block 210, display configuration may be performed on a display of the display subsystem. Appropriate parameters for display configuration may be determined based on display characterization parameters 226 and/or metadata 225, such as camera metadata 225A, post-production metadata 225B (including reference display and environment metadata $225B_1$ and source video content characterization metadata $225B_2$) and viewing environment metadata 225C. The display is configured in accordance with such parameters. Video data 203 is output to the display.

As metadata 225 is generated at blocks 202, 204, 206 or 208 for a video frame delivered through video delivery pipeline 200, metadata 225 may be serially written in available guard bits and/or LSBs of video frames delivered through the pipeline. The required metadata bandwidth may vary between video frames, depending on the frequency and size of metadata transmission for particular metadata types. According to certain embodiments, some types of metadata 225 may be transmitted downstream every 10 seconds or so (e.g. this may include reference display and environment metadata $225B_1$); other types of metadata 225 may be transmitted downstream once per frame sequence or once per scene change (e.g. this may include viewing environment metadata 225C); and still other types of metadata 225 may be transmitted once per frame or once every few frames (e.g. this may include some parameters of source video content characterization metadata $225B_2$).

For some video frames, it may be possible to sequentially embed all of metadata 225 generated at blocks 202, 204, 206 or 208 within the guard bits or LSBs of one video frame. For other video frames, metadata 225 generated at blocks 202, 204, 206 or 208 may require more than one video frame to deliver, and may exceed the metadata bandwidth provided by video delivery pipeline 200. This may result in non-delivery of metadata. As discussed in further detail below, systems, apparatus and/or methods are provided to manage the encoding and delivery of metadata 225 through video delivery pipeline 200 to ensure that metadata 225 is timely delivered and applied.

Metadata 225 that is used for processing of video data 203 at block 208 and display configuration at block 210 is delivered in the video data stream so that metadata 225 is received at the display subsystem (including the video processor and display) prior to its application. In some embodiments, metadata 225 is delivered so that it is received by the display subsystem at least one video frame ahead of the frame at which the metadata 225 is to be applied. In certain embodiments, metadata 225 is delivered one video frame ahead and application of metadata 225 at blocks 208 and/or 210 may be triggered upon detection of a new video frame in the incoming video stream.

Figure 6A:
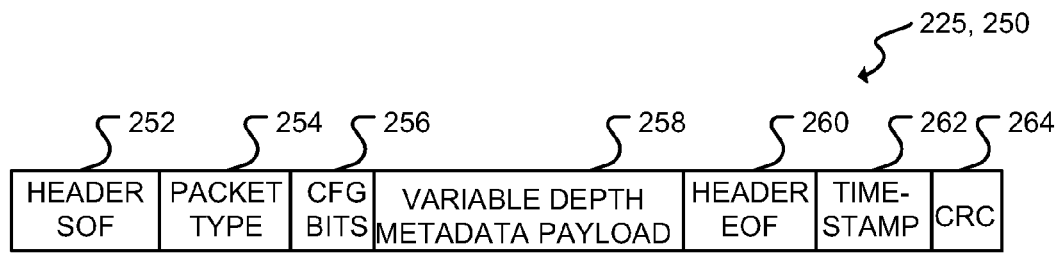
FIG. 6A shows a metadata packet according to one embodiment.

In particular embodiments, systems and/or apparatus of video delivery pipeline 200 comply with a metadata protocol defining a metadata structure. FIG. 6A illustrates a metadata structure or packet 250 of metadata 225 according to a particular embodiment that may be generated, for example, at any one of blocks 202, 204, 206 or 208 of the video delivery pipeline 200 of FIG. 3 and delivered downstream in the pipeline. Packet 250 is framed with a header. In the illustrated embodiment of FIG. 6A, packet 250 includes the following fields:

- a start of frame (SOF) header 252 defining the header with a start of frame bit set;
- a packet type 254 defining the type of metadata in the payload (e.g. gamut parameter, scene change flag, image histograms, etc.) and format or pattern of the subsequent metadata;
- CFG bits 256 defining a configurable portion of the framing structure (e.g. CFG bits 256 may define whether a timestamp is enabled for the packet, and how to apply the timestamp);
- metadata payload 258 which may be variable in length;
- end of frame (EOF) header 260 defining the header with an end of frame bit set;
- timestamp 262 (optional) indicating when data in metadata payload 258 is to be applied (e.g. a certain number of video frames or scenes after metadata packet 250 is received, or after some other delay); and
- a checksum such as, for example, a CRC (cyclic redundancy check) value 264 to enable verification of metadata packet 250.

Figure 6B:
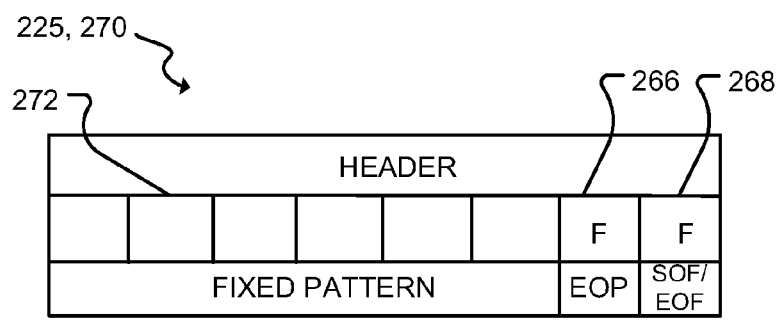
FIG. 6B shows a header that may be used to frame the metadata packet of FIG. 6A.

FIG. 6B illustrates a header 270 that may be used to define the start (i.e. SOF header 252) or end (i.e. EOF header 260) of a metadata packet 250 as shown in FIG. 6A. In the illustrated embodiment, header 270 begins with a plurality of bits in a predetermined pattern 272. Header 270 ends with an end of payload (EOP) flag or bit 266, and an SOF/EOF flag or bit 268 (e.g. 0/1). The SOF/EOF flag 268 determines whether header 270 is an SOF header 252 or an EOF header 260. The EOP flag 266 may be valid only if the EOF flag 268 is set. Setting the EOP flag 266 indicates that the metadata packet 250 contains the last portion of a metadata payload. The EOP flag 266 enables a metadata payload to be split among several metadata packets 250, which may be split across video frames. The EOP flag 266 enables low priority metadata packets to be interrupted to transmit high priority metadata packets.

Figure 10:
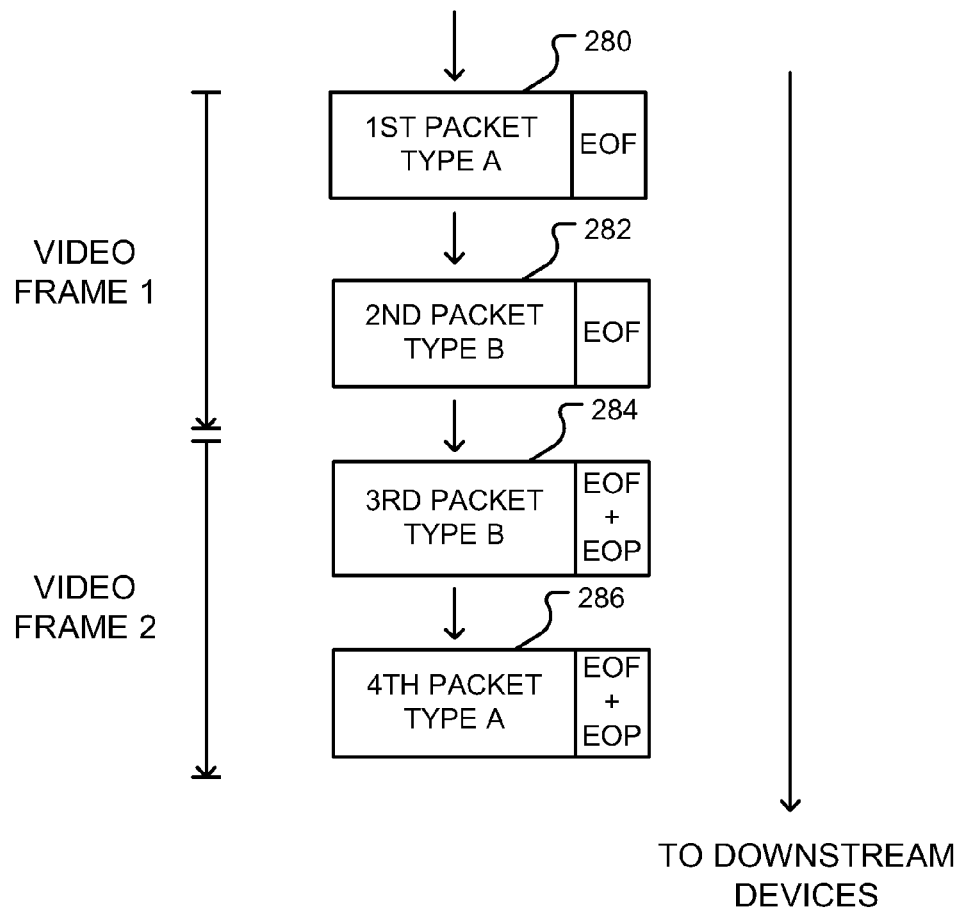
FIG. 10 shows a sequence of metadata packets containing different types of metadata transmitted over two consecutive video frames.

The EOP flag 266 enables packets carrying different types of metadata to be delivered over multiple video frames, as seen in FIG. 10. The type of metadata carried in a packet may be indicated by packet type 254 in the header (see FIG. 6A). In the illustrated example, a first packet 280 carrying type A metadata is embedded in video data of video frame 1. During embedding of type A metadata in the video data stream, type B metadata, having a higher priority than metadata type A, is received. To interrupt transmission of type A metadata in favour of type B metadata, an EOF flag is set to conclude first packet 280 (however, the EOP flag is not set as there is remaining type A metadata to be transmitted). A second packet 282 carrying the type B metadata may then be embedded in video data of video frame 1. In the illustrated example, video frame 1 does not have sufficient guard bits or LSBs for delivery of all of the type B metadata. Thus, toward the end of video frame 1 an EOF flag is set to indicate the end of second packet 282 (however, the EOP flag is not set as there is remaining type B metadata to be transmitted). A third packet 284 carrying the remaining type B metadata may be embedded in video data of video frame 2. The third packet 284 may be terminated with an EOF flag and an EOP flag to indicate the end of the packet and end of the metadata payload for the type B metadata. Delivery of type A metadata may then resume. In the illustrated example, all remaining type A metadata (which has been saved during embedding of metadata type B) is retrieved and carried in a fourth packet 286 of metadata embedded in the video data of video frame 2. The fourth packet 286 may be terminated with an EOF flag and an EOP flag to indicate the end of the packet and end of the metadata payload for the type A metadata.

According to particular embodiments, metadata bits are serialized onto bits (e.g. guard bits and/or LSBs) of video data in such a way so as to avoid inadvertently communicating a reserved or protected word or sequence of bits (which may be any number of bits long). There may be two types of reserved words: reserved metadata words as may be communicated by the metadata, and reserved video words as may be communicated by the video data stream. The metadata may be encoded so that the metadata payload avoids matching a reserved metadata word, such as a packet end of frame or EOF header 260 (FIG. 6A). In embodiments where guard bits of video data are overwritten with metadata, the serialized metadata should avoid overriding the function of the guard bits, which is to prevent reserved video words from being communicated by the video data. For example, in some video formats such as VDR or HDMI formats, the guard bits are used to ensure that certain reserved video words (e.g. reserved pixel values) are not transmitted. Reserved pixel values may include, for example, 0, 255 and other reserved values.

Figure 4A:
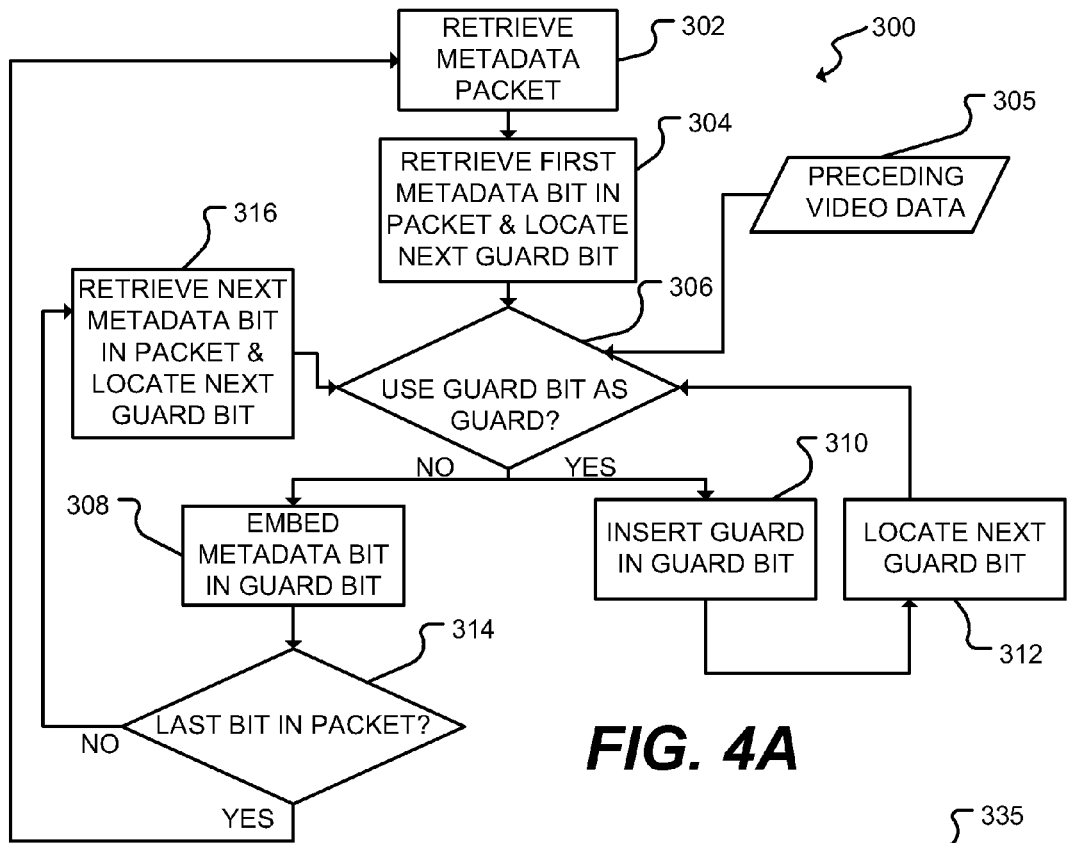
FIG. 4A is a flowchart showing a method according to one embodiment of encoding metadata in video data.

FIG. 4A illustrates a method 300 of encoding metadata bits in video data so as to avoid communication of reserved video words. Method 300 may be applied to serialization of metadata in video data in a VDR or other video format which uses guard bits. Method 300 begins at block 302 by receiving metadata to be carried in the video data stream. The metadata may be received, for example, from a metadata generator or encoder at any one of blocks 202, 204, 206 or 208 of video delivery pipeline 200 shown in FIG. 3. In certain embodiments, the metadata received at block 302 is metadata to be applied at future video frames (e.g. for processing of video data and/or display configuration), so that the metadata is delivered in the video data stream at least one video frame ahead of the frame at which the metadata is to be applied. The metadata may be encoded as a metadata packet (e.g. a metadata packet 250 as shown in FIG. 6A). At block 304, the first bit in the metadata packet is retrieved and the next available guard bit is located in the video data stream (i.e. a guard bit which has not been overwritten with metadata). At block 306, the video data stream (in some embodiments including previously transmitted metadata) is considered to determine whether the guard bit may be required as a guard to prevent unintentional communication of one or more reserved video words. If conditions are such that the guard bit should be used as a guard, a guard is inserted in the guard bit at block 310. In other embodiments, guards may be written in the guard bits during encoding of video data; therefore a guard may already be contained in the guard bit and the guard bit may be skipped at block 310; no metadata bit is inserted in the skipped guard bit.

The block 306 guard conditions for inserting a guard may include, for example, considering whether bits in the video data stream preceding the guard bit are close to matching (e.g. are one bit short of matching) a reserved video word. This determination may be made by comparing the preceding bits in the video data stream to each word in a list of reserved video words.

After inserting a guard in the guard bit at block 310 (or skipping the guard bit), the next guard bit is located in the video data stream at block 312 and the block 306 test is applied to this next guard bit to determine whether the guard bit should be used as a guard (or whether metadata may be written in the guard bit).

If it is determined at block 306 that a particular guard bit is not required to be used as a guard, then the bit of metadata may be written in the guard bit at block 308. As long as there are remaining bits of the metadata packet to be embedded in the video data stream (see block 314), subsequent bits are retrieved from the metadata packet and subsequent guard bits are located in the video data stream (see block 316). For each metadata bit retrieved and guard bit located, the block 306 test is applied to determine whether to treat the guard bit as a guard (block 310) and skip to the next guard bit (block 312); otherwise, metadata may be written in the guard bit (block 308).

In particular embodiments, the block 306 guard conditions are evaluated by considering the bits of pixel data 305 immediately prior to the guard bit to determine if a reserved video word could potentially be communicated by the video data. For example, for video formats where reserved video words comprise certain pixel values such as 0 and 255 (e.g. represented in binary form as 00000000 and 11111111, respectively), the seven bits of pixel data 305 preceding the guard bit may be considered at block 306. If the preceding seven bits are all consecutive zeros or consecutive ones, then the guard bit (which would be the eighth bit in the series of video data bits) should function as a guard. The guard bit may be set with an appropriately selected guard of 0 or 1 at block 310 to prevent communication of a reserved video word. Reserved video words may comprise other words or sequences of bits of various lengths. The block 306 guard conditions may evaluate pixel data 305 to detect potential communication of any of these reserved video words.

Metadata 225 may be encoded so as to avoid unintended communication of reserved metadata words. Reserved metadata words may include, for example, a packet start of frame header defining the start of a metadata packet or a packet end of frame header defining the end of a metadata packet. Encoding methods used to avoid unintended communication of reserved metadata words may include, for example:

- 6b/8b encoding (wherein the longest permitted run of consecutive identical bits is 6 bits long).
- 8b/10b encoding (wherein the longest permitted run of consecutive identical bits is 5 bits long).
- Defining a fixed pattern of consecutive identical bits to represent reserved metadata words such as SOF header 252 or EOF header 260, and avoiding encoding the fixed patterns during embedding of the metadata payload in the video data. For example, if the fixed patterns are the six bit long patterns 000000 and 111111, whenever the five bit long pattern 00000 or 11111 appears in the metadata payload, a 1 or 0 guard bit is embedded as the next bit in the video data stream (e.g. 000001 or 111110). During extraction of metadata from the video data stream, this guard bit is not considered valid and is disregarded.

Figure 4B:
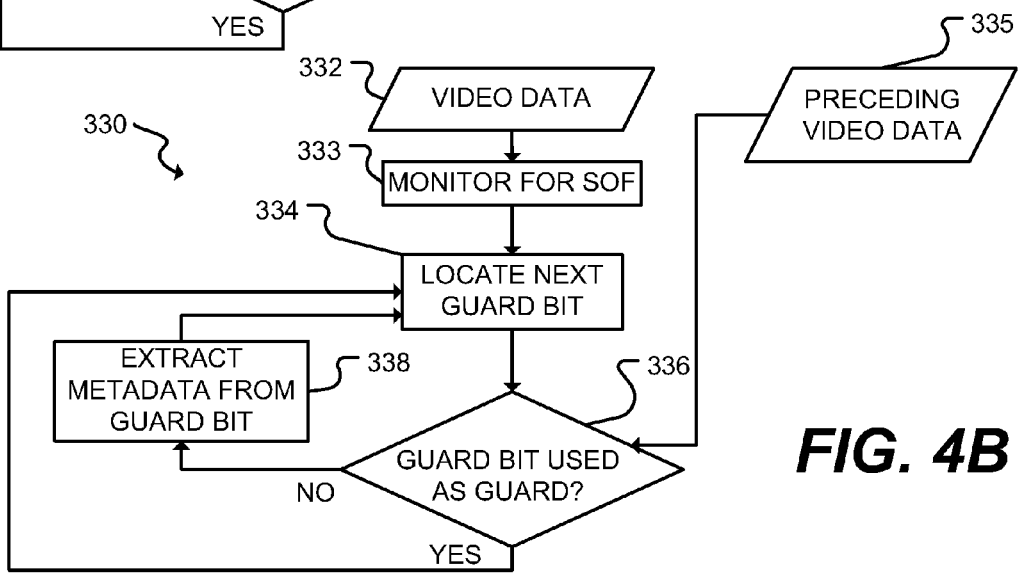
FIG. 4B is a flowchart showing a method according to one embodiment of decoding metadata that has been encoded in video data using the method of FIG. 4A.

FIG. 4B shows a method 330 of retrieving metadata bits that have been encoded using method 300 of FIG. 4A from a video signal. Method 330 begins by receiving a stream of video data 332 and monitoring video data 332 at block 333 to detect an SOF header 252 (see FIG. 6B) or other reserved metadata word defining the start of a metadata packet. Detection of the start of a metadata packet at block 333 may include receiving and decoding guard bits in video data stream (and skipping guard bits that are used as guards to prevent communication of reserved video words) until a series of metadata bits forming an SOF header 252 is detected. After the start of a metadata packet has been detected at block 333, method 300 proceeds by locating the next guard bit in the video data stream at block 334. At block 336, preceding video data 335 (i.e. video data bits received immediately prior to the guard bit) is considered to determine whether the guard bit is functioning as a guard so as to prevent communication of a reserved video word in the video data stream. If it is determined at block 336 that the guard bit is not being used as a guard (i.e. metadata is written in the guard bit), metadata is extracted from the guard bit at block 338.

If it is determined at block 336 that the guard bit is being used as a guard, the next guard bit in the stream of video data 332 is located at block 334, and the block 336 test is applied to this next guard bit to determine whether the guard bit is being used as a guard (otherwise, the guard bit contains metadata that may be extracted at block 338).

In particular embodiments, the block 336 evaluation may be performed by comparing bits of video data 335 immediately prior to the guard bit with fixed patterns of bits indicative of reserved video words. Block 336 determines whether a reserved video word could potentially have been communicated by the video data if a guard were not inserted in the guard bit. If a reserved video word could potentially have been communicated, then it may be assumed that the guard bit is being used as a guard and method 300 proceeds to block 334 by locating the next guard bit in the video data stream. However, if a reserved video word could not have been communicated, then it may be assumed that the guard bit contains metadata, which may be extracted from the guard bit at block 338.

Figure 2A:
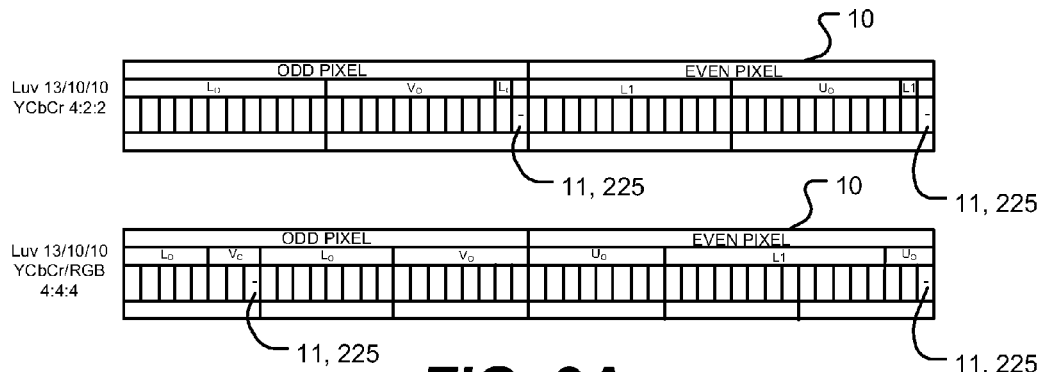
FIG. 2A illustrates frames of video data in visual-dynamic range (VDR) format, having guard bits which may be used to carry metadata according to particular embodiments.
Figure 2B:
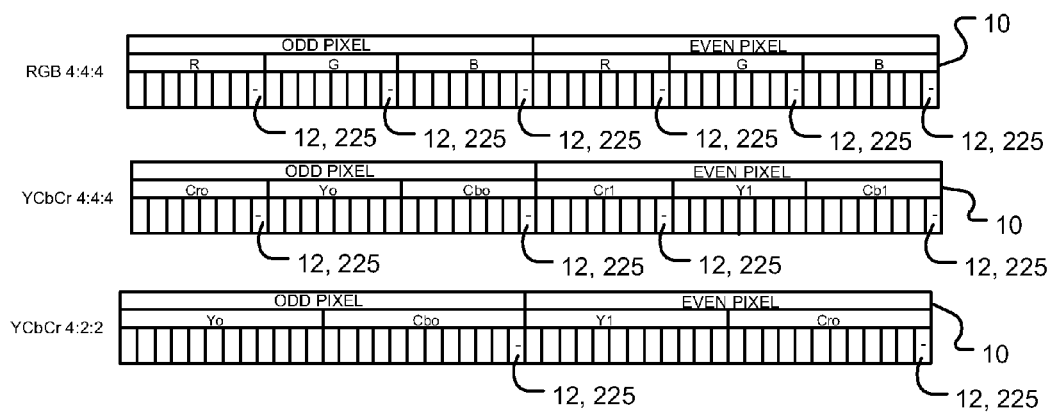
FIG. 2B illustrates frames of video data in non-VDR formats, having least significant bits in each chrominance channel which may be used to carry metadata according to particular embodiments.
Figure 2C:
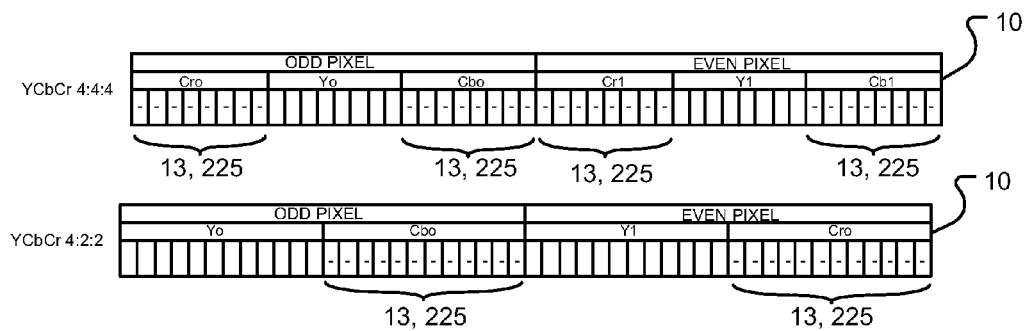
FIG. 2C illustrates frames of video data in non-VDR formats, having groups of bits which may be used to carry metadata according to particular embodiments.

In other embodiments, metadata is written in the LSBs 12 of the chrominance channels of a video frame (e.g. see FIG. 2B) instead of in the guard bits 11 of a video frame (e.g. see FIG. 2A). Metadata 225 may be encoded in the LSBs 12 so as to avoid unintended communication of reserved metadata words (e.g. a start of frame header or end of frame header). Metadata 225 may be encoded using one of the methods described above (e.g. 6b/8b encoding, 8b/10b encoding, defining the reserved words as fixed patterns of consecutive identical bits, etc.) to avoid unintended communication of reserved metadata words.

Figure 5A:
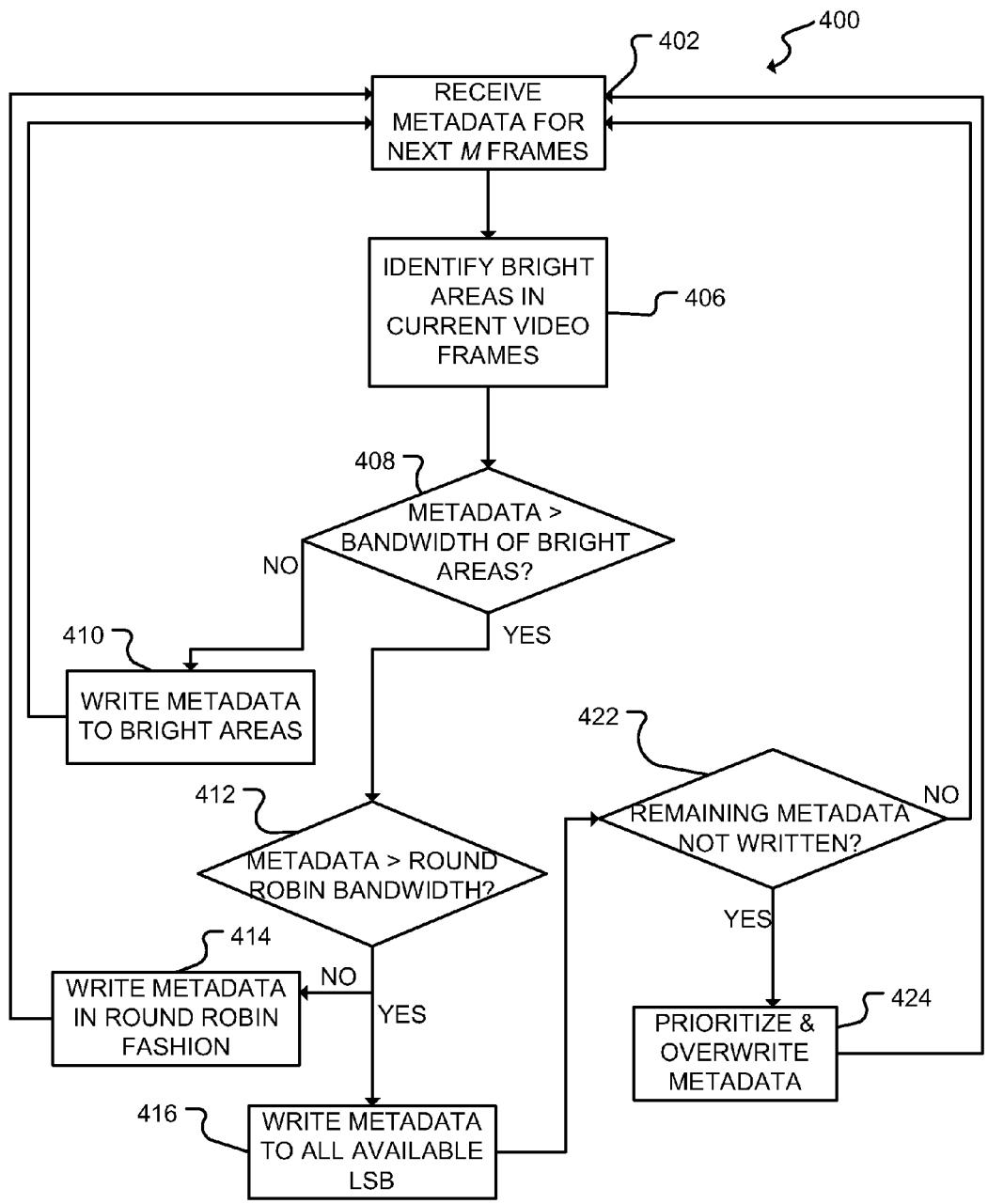
FIGS. 5A and 5B are flowcharts showing methods of encoding metadata in video data according to other particular embodiments.

The image quality in video content display may be affected as a result of overwriting bits of chrominance data such as LSBs 12. Particular methods of encoding metadata in LSBs may be used to reduce adverse impact on image quality. FIG. 5A shows a method 400 that may be used for encoding metadata in LSBs 12 of chrominance channels of a video frame (e.g. see FIG. 2B). Method 400 evaluates different ways of encoding metadata in LSBs 12 of chrominance channels. The selected manner of encoding metadata may affect the image quality in video content display.

Method 400 begins at block 402 by receiving metadata 225 for the next (future) M video frames. The metadata 225 received at block 402 is metadata to be applied at future video frames (e.g. for video processing and/or display configuration), so that it may be delivered in the video data stream at least one video frame ahead of the frame at which the metadata is to be applied. Method 400 proceeds by considering whether metadata 225 may be embedded in a certain way to minimize artifacts during display. For example, metadata 225 may be written in LSBs of chrominance channels of pixels representing brighter areas of an image (e.g. pixels in which luminance exceeds some threshold), given that changes in a displayed image caused by overwriting the LSB tend to be less noticeable in brighter image areas. In some embodiments, metadata is written to LSBs of chrominance data for pixels in which chrominance values exceed some threshold. At block 406 of method 400, bright image areas to be displayed by the video frames are identified. An assessment is made at block 408 as to whether the pixels representing the bright image areas provide sufficient bandwidth to transmit metadata 225. If there is sufficient bandwidth, metadata 225 may be written in the LSBs of chrominance channels of pixels in the brighter image areas at block 410. Otherwise, method 400 may proceed by evaluating another method of writing metadata 225. Prior to writing metadata 225 in the pixels of brighter image areas at block 410, a first metadata packet may be transmitted in the video data stream in the default manner (e.g. writing in the LSB of each chrominance channel) to indicate to the video receiver or processor the area(s) in the video frame in which subsequent metadata 225 is encoded.

Method 400 may evaluate at block 412 whether writing of metadata 225 in round robin fashion (or in some other manner which skips LSBs so as to minimize artifacts in the displayed image) would provide sufficient bandwidth for transmission of metadata 225. If sufficient bandwidth would be available, at block 414 metadata 225 is written in the LSBs of chrominance channels of video frames in round robin fashion (e.g. a first pixel has an embedded metadata bit in the red channel only, a second pixel has an embedded metadata bit in the green channel only, a third pixel has an embedded metadata bit in the blue channel only, etc.). Prior to writing metadata 225 in round robin fashion, a first metadata packet may be transmitted in the video data stream in the default manner (e.g. writing in the LSB of each chrominance channel) to signify to the video receiver or processor that the metadata 225 that follows is written in round robin fashion. The first metadata packet may indicate where in the video frame the metadata 225 (written in round robin fashion) is embedded. The first metadata packet may provide for methods of synchronizing of metadata delivery between the transmitting and receiving ends of the video delivery pipeline.

If insufficient bandwidth is provided by a round robin manner of writing metadata, at block 416 a default method of embedding metadata may be applied (e.g. metadata 225 may be written in each LSB of chrominance channels in the video frames). If any metadata 225 remains which has not yet been embedded in the video data stream after writing of metadata 225 at block 416 (see block 422), delivery of the remaining metadata 225 may be prioritized and managed at block 424. Metadata 225 may be split into multiple packets for transmission. Using an EOP flag, transmission of metadata packets may be interrupted in favour of transmission of metadata packets of a higher priority, as described herein with reference to FIGS. 8 and 10.

Figure 5B:
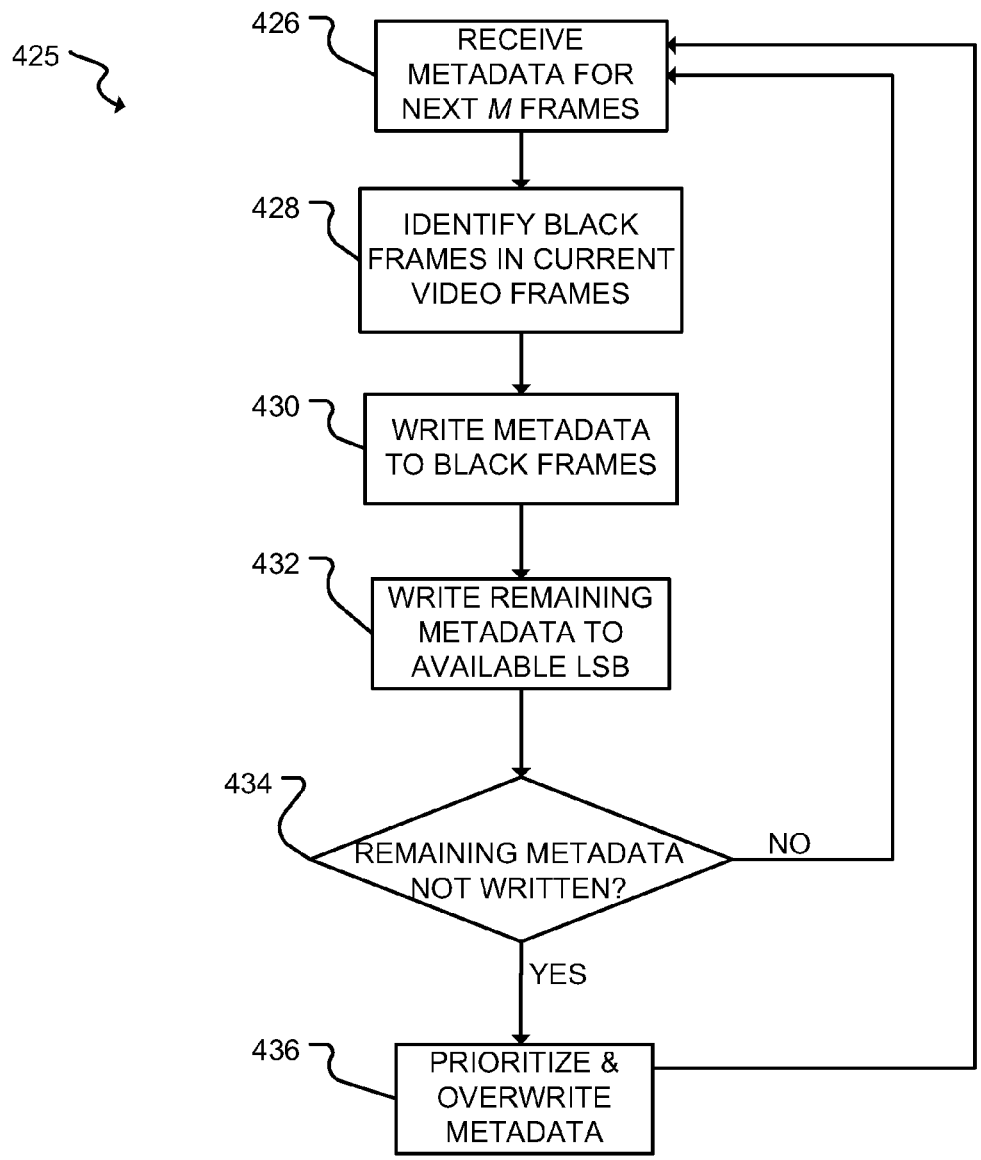

FIG. 5B shows a method 425 that may be used for encoding metadata by overwriting chrominance data in a video frame to provide bursts of metadata. For example, chrominance portions for pixels in black frames or black image areas (where luminance values for the pixels are at zero or are below some threshold) may be used for carrying metadata, as the chrominance data for such pixels may be overwritten without substantially affecting image quality. A large number of pixels have luminance values of zero or a very small value in the following kinds of frames, for example:

Black frames, such as may be used to transition between different scenes of a film, or between commercials and scheduled programming, for instance.

Frames of particular video formats, such as letterboxed, pillarboxed and windowboxed formats in which the video image is displayed with mattes or black bars at the sides and/or above and below the video image. Such formats are typically used to preserve the video's original aspect ratio on a display.

Method 425 begins at block 426 by receiving metadata 225 for the next M video frames. At block 428, method 425 identifies any black frames (or black image areas) in the current video frames which may be used to carry metadata bursts. At block 430, a plurality of bits of metadata 225 are written within the chrominance channels of pixels in the identified black frames (or black image areas). For example, a series of metadata bits 13 may be inserted in chrominance channels as shown in FIG. 2C so as to overwrite the chrominance data. Prior to writing metadata 225 in the chrominance channels, a first metadata packet may be transmitted in the video data stream in the default manner (e.g. writing in LSBs) to provide information which signals to the video data receiver or processor that the metadata 225 that follows is written in the chrominance channels for the pixels.

At block 432, if any metadata 225 remains (i.e. which is not written in the chrominance channels of pixels in the black frames), such metadata 225 may be written in the available LSBs in the current non-black video frames. If after all available LSBs have been filled, there remains metadata 225 that has not yet been embedded in the video data stream (see block 434), delivery of the remaining metadata 225 may be prioritized and managed (block 436). Particular methods for prioritizing metadata are described in further detail below with respect to FIG. 8.

For certain video formats, video images may be displayed with mattes or black bars at the sides and/or above and below the video image. When video data is provided in such formats, metadata 225 may be embedded within the chrominance channels of the pixels representing the black mattes or bars.

In other embodiments, a method which is a variation of or a combination of steps of methods 300, 400 and/or 425 may be applied to manage metadata delivery. For example, a particular method may combine the steps of providing metadata bursts by overwriting chrominance data in black video frames and/or areas, and writing metadata in guard bits or in LSBs of chrominance channels in non-black video frames.

Each method that is applied to encode metadata 225 in the video data stream may incorporate steps to ensure that a reserved video word is not unintentionally communicated by the video data. For example, methods similar to those described above with reference to FIGS. 4A and 4B may be performed in which the preceding video data transmitted is considered and compared to lists of reserved video words, and if appropriate, a guard is set in the guard bit to protect against communication of the reserved video words.

Figure 8:
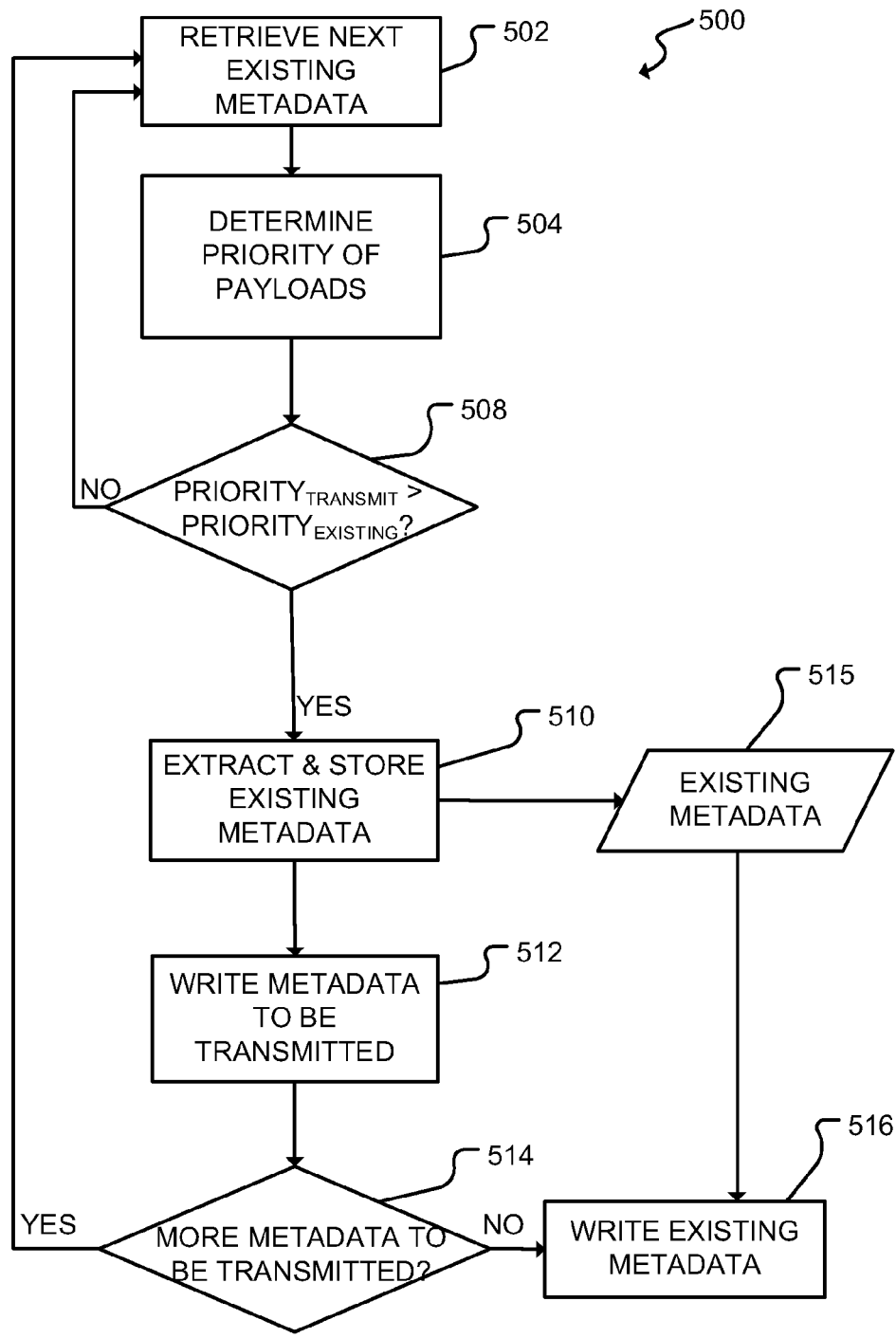
FIG. 8 is a flowchart showing a method of managing delivery of metadata according to one embodiment.

FIG. 8 is a flowchart illustrating a method 500 for managing delivery of metadata according to one embodiment. According to method 500, transmittal of metadata through the video delivery pipeline may be temporarily interrupted to allow transmittal of other metadata categorized as relatively higher priority metadata. Interruption of metadata delivery may be required given that there are multiple stages along video delivery pipeline 200 at which metadata may be generated and embedded in the video data stream. For certain video frames (e.g. video frames which have metadata generated at multiple stages of the video delivery pipeline), there may be insufficient metadata bandwidth available to deliver metadata 225 to a downstream device prior to the time at which metadata 225 is to be applied by the downstream device.

Method 500 may be performed if there is new metadata that is to be embedded in a video data stream, but the current video frames in the video data stream do not have the metadata bandwidth for carrying the new metadata and existing metadata. For example, existing metadata 225 may have already been embedded in the current video frames at a previous stage of the video delivery pipeline, leaving insufficient bandwidth for delivery of new metadata. FIG. 8 begins at block 502 by locating and retrieving an existing metadata structure which is embedded in the video data stream. The priority of the existing metadata structure and the priority of the new metadata structure to be transmitted are determined at block 504. In certain embodiments, particular metadata types may be assigned a particular priority level. Therefore, the priority determination at block 504 may be based on metadata type as defined in the frame header. At block 508, the priorities determined at block 504 are compared. If the priority of the new metadata structure to be transmitted is lower than the priority of the existing metadata structure embedded in the video data stream, method 500 proceeds to block 502 by retrieving the next metadata structure which is embedded in the video data stream. The steps at blocks 502 to 508 may be repeated until an existing metadata structure is located in the video data stream which has a lower priority than the new metadata structure to be transmitted (or until metadata bandwidth in the video data stream becomes available).

If at block 508, the priority of the new metadata structure to be transmitted is higher than the priority of the existing metadata structure embedded in the video data stream, method 500 interrupts transmission of the existing metadata structure at block 510 by extracting existing metadata 515 from the video data stream and storing the existing metadata 515 for later transmittal. At block 512, the video data guard bits or LSBs previously occupied by metadata 515 are overwritten with the new metadata structure to be transmitted.

If after overwriting the video data guard bits or LSBs previously occupied by metadata 515 with new metadata (see block 512), there is remaining new metadata that needs to be transmitted (see block 514) and limited metadata bandwidth is available for such transmission, method 500 may proceed by retrieving the next existing metadata structure embedded in the video data stream (block 502) and comparing its priority to that of the new metadata (block 504). If the priority of the remaining new metadata to be transmitted is higher, transmission of the existing metadata structure may be interrupted as described above in favor of transmission of the new metadata at blocks 510 and 512.

If there is no further new metadata to be transmitted (block 514), transmission of existing metadata 515 may resume. This may be accomplished by rewriting metadata 515 to guard bits or LSBs in the video data stream at block 516.

In some situations, metadata is embedded in and delivered contemporaneously within the video frames for which the metadata is to be applied during processing or display of the video frames. In other situations, metadata which is to be applied for a particular video frame may be transmitted with the video data for one or more earlier video frames. Metadata may be delivered to and received by a video decoder, processor or other downstream device in advance of the particular video frame at which the metadata is to be applied. To facilitate processing of and application of metadata, the metadata packet(s) carrying a metadata payload may include a timestamp indicating when the metadata is to be applied. In some embodiments, the timestamp may be defined in terms of a frame delay indicating that the metadata is to be applied at a certain number of video frames after the metadata has been received. In other embodiments, the timestamp may be defined in terms of a time delay, a frame sequence number, a time relative to the start of the video, or the like.

In some embodiments, metadata may be carried in the pixel data for a black frame inserted between scene transitions or within a scene. At the display end (block 210 of FIG. 3), the display may repeat playback of the video frame preceding the black frame, to avoid interruption in the display of the scene while metadata in the black frame is being extracted and/or applied. Prior to writing metadata in the pixel data for the black frame, a first metadata packet may be transmitted in the video data stream in the default manner (e.g. writing in the guard bit or writing in the LSB of each chrominance channel) to signify to the downstream device that the metadata 225 that follows is written in a black frame. In certain embodiments, the display may playback the black frame containing metadata. In other embodiments, the display may not playback the black frame containing metadata (i.e. display of the black frame is skipped). The display may repeat playback of the video frame preceding the black frame, while extracting and/or applying metadata from the black frame.

Figure 7:
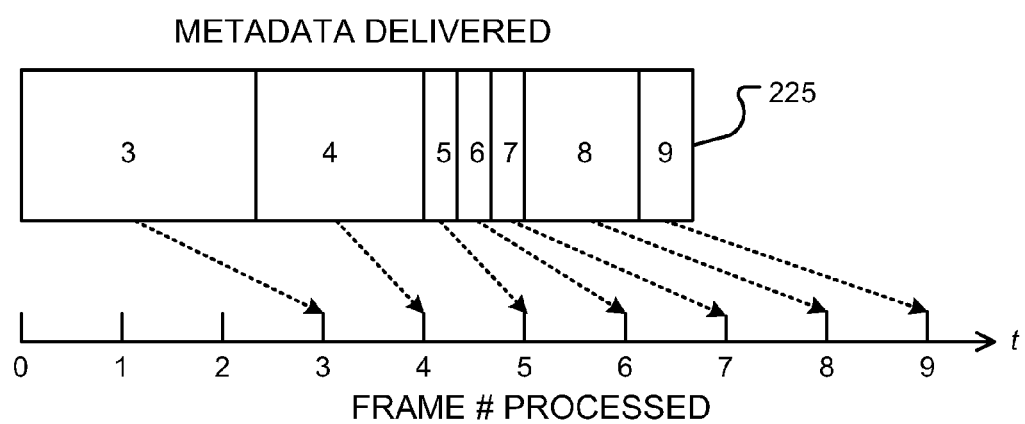
FIG. 7 shows metadata that may be delivered for a sequence of frames, and a timeline illustrating when the received metadata is to be applied.

FIG. 7 shows metadata 225 that is carried through a video delivery pipeline and received by a downstream device (e.g. video processor, decoder and/or display) in advance of the time at which the metadata is processed and applied. Metadata 225 includes six metadata payloads, each associated with a video frame (i.e. one of video frames #3 through #9). As seen in FIG. 7, while the metadata payload associated with video frame #3 is being delivered to a downstream device, the downstream device is processing video frames #1 and 2. A timestamp for the metadata payload associated with video frame #3 may indicate that the metadata payload is to be applied three frames after the metadata payload is received.

The use of timestamps may facilitate delivery of all metadata for a scene to ensure that such metadata is available to a downstream device prior to application of the metadata by the downstream device (e.g. metadata may be applied for processing of video data and/or display configuration for the scene). The metadata may be embedded in video data during a scene transition (e.g. the metadata may be delivered with black frames inserted between scenes). The metadata may be embedded in chrominance data in frames or areas of a frame where luminance values are driven to zero (e.g. using the methods described herein with reference to FIG. 5B). In embodiments where uncompressed video data is delivered at block 206 (FIG. 3), timestamps may be used to manage delivery of metadata in the video data between the encoder at encoder stage 207A and the video processor/decoder at block 208 (FIG. 3A).

Figure 9:
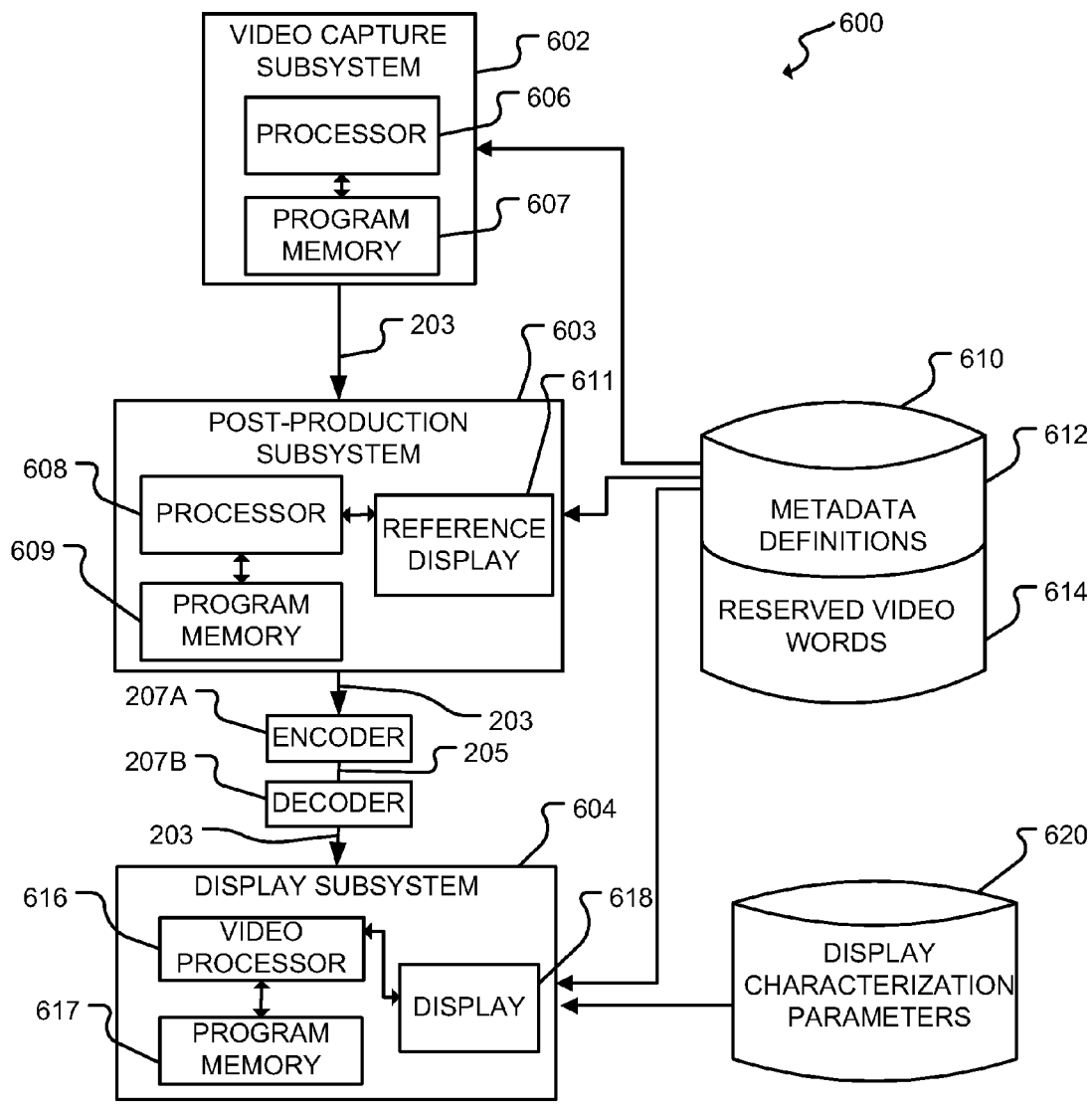
FIG. 9 schematically depicts a system according to one embodiment which may be used to implement one or more of the methods described herein.

FIG. 9 shows a system 600 according to one embodiment that may be configured to perform one or more of the methods described herein. Components of system 600 may be implemented as software, hardware and/or a combination thereof. System 600 includes a video capture subsystem 602, a post-production subsystem 603 and a display subsystem 604. A stream of video data 203 is generated by video capture subsystem 602 and is delivered to post-production subsystem 603 for processing and editing. Video images may be displayed and viewed on a reference display 111 of post-production subsystem 603 in the course of editing the video data 203. The edited video data 203 is delivered to display subsystem 604 (over a distribution medium 205 by way of encoder 207A and decoder 207B) for further processing and display. Each of subsystems 602, 603 and 604 (and encoder 207A) may be configured to encode metadata 225 in video data 203. Downstream subsystems may be configured to receive video data 203 from an upstream device and decode the metadata 225 which has been embedded therein. Metadata 225 may be used by downstream subsystems (e.g. subsystems 603 and 604) to guide processing and/or display of video data 203. Metadata 225 may be used by display subsystem 604 along with display characterization parameters 620 to control and/or guide video playback on a display 618 of display subsystem 604.

As seen in FIG. 9, subsystems 602, 603 and 604 may comprise a processor 606, 608 and 616 respectively, and a program memory 607, 609 and 617 accessible to the respective processors. Each processor may comprise a central processing unit (CPUs), one or more microprocessors, one or more field programmable gate arrays (FPGAs), or any combination thereof, or any other suitable processing unit(s) comprising hardware and/or software capable of functioning as described herein. In each subsystem the processor executes instructions provided by software stored in the program memory. The software may include routines to perform the metadata generation, encoding, decoding and processing steps described herein, such as, for example, routines which:

generate metadata 225 or receive parameters for metadata 225 (e.g. such parameters may be set by color timers or color graders at the post-production stage; metadata 225 may define certain parameters as described herein with reference to FIG. 3);
  decode metadata 225 from video data 203 received from an upstream device;
  process and apply metadata 225 to guide processing and/or display of video data;
    encode metadata 225 in video data 203 before such video data is communicated to a downstream device;
  interrupt delivery of lower priority metadata 225 so as to allow for delivery of higher priority metadata 225 in the video data stream;
  select a method for encoding metadata 225, based on the image and/or video data 203 (e.g. the method of encoding metadata 225 may be selected to minimize adverse effects on image quality);
  manage encoding of bursts of metadata 225 in chrominance portions of video frames, areas of video frames or pixels for which luminance values are zero or below a threshold value;
  and/or the like.

System 600 may include a repository 610 accessible to subsystems 602, 603 and 604. Repository 610 may include a library of metadata definitions 612 (e.g. which informs the metadata encoders and decoders as to how to generate and/or read the metadata) and a list of reserved video words 614 (e.g. protected pixel values). The library of metadata definitions 612 may be accessed by subsystems 602, 603 and 604 in generating, encoding and/or processing metadata. In encoding or decoding metadata 225, reserved video words 614 may be compared to video data bits preceding a guard bit as described above to identify whether the guard bit is treated as a guard to prevent communication of reserved video words.

While a shared repository 610 is shown in the illustrated embodiment of FIG. 9, in other embodiments each of subsystems 602, 603 and 604 may incorporate a local repository 610 stored in a storage medium accessible to that subsystem.

Figure 11A:
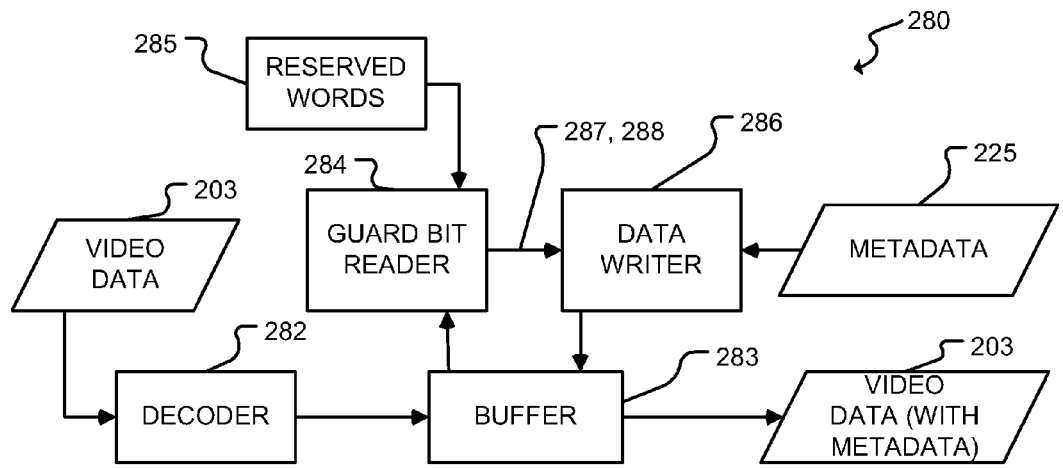
FIG. 11A schematically depicts a subsystem according to one embodiment that may be used to encode metadata in video data.

FIG. 11A shows a subsystem 280 that may be used to encode metadata in a stream of video data according to an example embodiment. Subsystem 280 may be used to encode metadata 225 relating to an upcoming scene or other sequence of frames, using method 300 shown in FIG. 4A, for example, or another method described herein. Subsystem 280 may receive input video data 203 from a source of video data.

In some embodiments, subsystem 280 may retrieve input video data 203 from a buffer or other storage media. In other embodiments, subsystem 280 may receive streaming video data 203 from a video signal input. Video data 203 may be provided in a format suitable for the type of video content delivery, such as television broadcast over satellite, cable, or high-definition networks; streaming multimedia over IP or wireless networks; or reading a DVD or other storage media, or the like.

Input video data 203 may include embedded metadata which was added to the video data by an upstream apparatus. According to some embodiments, input video data 203 may include guard bits. Input video data 203 may contain luminance and chrominance information. In particular embodiments, video data 203 is decoded by a decoder 282. Decoder 282 may separate the luminance and chrominance components in the video signal.

Video data 203 for the upcoming scene or sequence of frames may be pushed into one or more data buffers 283 implemented by software and/or hardware. One or more frames of video data 203 (or other portion of video data 203) may be pushed into buffer 283, in succession, as video data 203 is received. In some embodiments, guard bit reader 284 determines where to begin inserting metadata in the video data stream, by monitoring the guard bits of the buffered video data 203 in buffer 283 (skipping those bits that contain a guard) until a reserved metadata word (e.g. end of metadata payload, or the like) is detected; new metadata 225 may be written in the video data after such reserved metadata word. In other embodiments, guard bit reader 284 may receive a signal or read a metadata packet indicating the location in the video data stream 203 at which subsystem 280 may commence encoding metadata in the video stream.

To begin encoding metadata, guard bit reader 284 accesses the video data 203 stored in buffer 283 and considers each guard bit in turn. For each guard bit considered, guard bit reader 284 may compare video bits preceding the guard bit to each of a plurality of reserved video words (e.g. reserved pixel values) accessed from a reserved word store 285. Based on such comparison, guard bit reader 284 may identify whether the guard bit is functioning as a guard to prevent communication of reserved video words, or whether the guard bit may contain metadata.

If guard bit reader 284 determines that the guard bit may contain metadata, guard bit reader 284 may send a signal 287 to data writer 286 communicating that metadata 225 (or other data) may be written in the guard bit (as discussed in respect of block 308 of FIG. 4A, for example). Guard bit reader 284 may continue to access and read video data 203 in buffer 283 until all of the metadata 225 for a particular scene or sequence of frames has been written in video data 203.

When data writer 286 receives signal 287, data writer 286 retrieves the next bit of metadata 225 relating to the upcoming scene. Data writer 286 writes this bit of metadata 225 in the guard bit determined by guard bit reader 284 to be suitable for carrying metadata. Data writer 286 may retrieve metadata 225 from a store or buffer containing metadata. After data writer 286 has written metadata 225 in all of the available guard bits of video data 203 in buffer 283, subsystem 280 outputs video data 203 including the inserted metadata 225 (e.g. video data 203 may be pushed out from buffer 283 and new incoming frames of video data 203 are pushed into buffer 283; metadata 225 may then be written in the new frames of video data 203 in buffer 283). Output video data 203 may be delivered to a downstream apparatus such as a display subsystem for processing and/or video playback.

If guard bit reader 284 identifies that a guard bit is not suitable for carrying metadata (as it contains a guard), guard bit reader 284 may communicate a signal 288 to data writer 286 causing data writer 286 to insert a guard in the guard bit (as discussed with reference to block 310 of FIG. 4A, for example). In other embodiments, signal 288 or lack of assertion of signal 287 may cause data writer 286 to skip the guard bit. As such, data writer 286 does not write any metadata 225 in this guard bit.

Figure 11B:
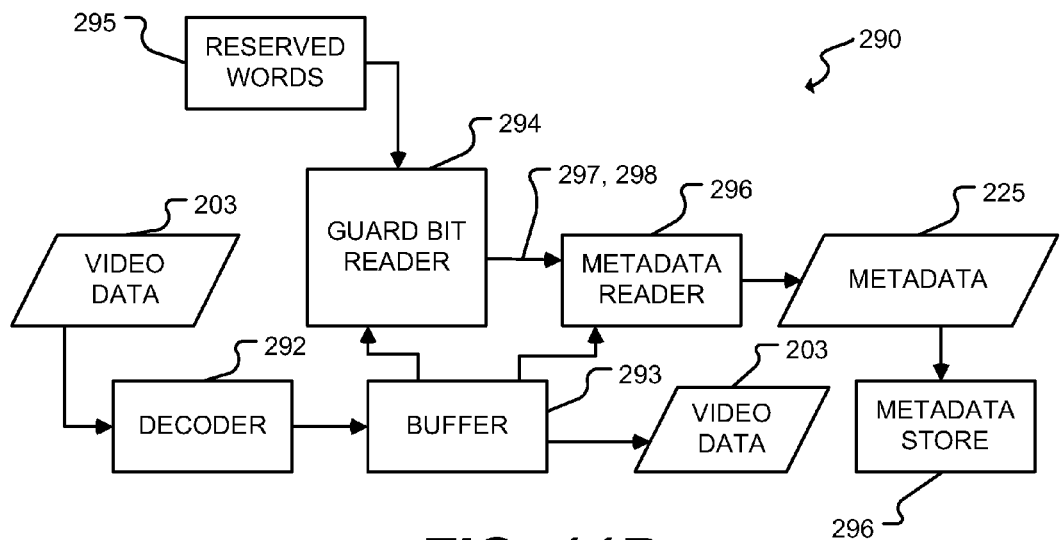
FIG. 11B schematically depicts a subsystem according to one embodiment that may be used to extract metadata from video data.

FIG. 11B shows a subsystem 290 that may be used to decode metadata from a stream of video data according to an example embodiment. Subsystem 290 may be used to extract metadata 225 for an upcoming scene, using one of the methods described herein, such as, for example, method 330 of FIG. 4B. Subsystem 290 is similar in some respects to subsystem 280. For example, subsystem 290 receives input video data 203, and may decode input video data 203 at a decoder 292 (similarly to how subsystem 280 receives and decodes input video data 203). Input video data 203 may be buffered in a buffer 293. A guard bit reader 294 accesses the video data 203 stored in buffer 293 and considers each guard bit in turn. For each guard bit considered, guard bit reader 294 may compare video bits preceding the guard bit to each of a plurality of reserved video words (e.g. reserved pixel values) accessed from a reserved word store 295. Based on such comparison, guard bit reader 294 may identify whether the guard bit is functioning as a guard to prevent communication of reserved video words, or whether the guard bit may contain metadata.

If it is determined by guard bit reader 294 that a guard bit may contain metadata, guard bit reader 294 may send a signal 297 to a metadata reader 296 causing metadata reader 296 to read the guard bit (as performed at block 338 of FIG. 4B, for example). Metadata 225 that is read from the guard bits may be stored in a metadata store 296 for subsequent retrieval and application.

If it is determined by guard bit reader 294 that a guard bit contains a guard, guard bit reader 294 may, in some embodiments, send a signal 298 to metadata reader 296 causing metadata reader 296 to skip reading the guard bit. In other embodiments, metadata reader 296 reads metadata from a guard bit only if it receives a signal 297, and a lack of assertion of signal 297 causes the guard bit to be skipped by metadata reader 296.

In some embodiments, guard bit readers 284, 294 may not need to monitor guard bits in the incoming video stream to locate where to begin encoding or decoding video data. When metadata is written in video data, a metadata packet may be generated by the metadata writer and inserted in the video data stream, indicating to downstream apparatus where to locate existing metadata in the video data (e.g. in certain video frames, or commencing at a particular pixel in a video frame, or in particular image areas, etc.). This metadata packet may be used by subsystem 280 to guide writing of additional metadata in the video data and may be used by subsystem 290 to guide extraction of metadata from the video data. This metadata packet may be useful for synchronizing delivery of metadata through the video delivery pipeline. The metadata packet may also indicate to the downstream apparatus the pixel value that should be used to drive the display, for the pixels where metadata is extracted. This enables metadata to be encoded in areas of an image having a constant hue.

In other embodiments, subsystem 280 and subsystem 290 may be adapted or reconfigured to write metadata in video data according to some other method. For example, for embodiments where LSBs of chrominance portions of video data are used to transport video data, a least significant bit writer may be provided in place of guard bit reader 284 and data writer 286 of subsystem 280. Similarly, a least significant bit reader may be provided in place of guard bit reader 294 and metadata reader 296 of subsystem 290. The least significant bit writer may access the video data 203 in buffer 283 and write metadata in the LSBs of chrominance portions of the video data. The least significant bit reader may access the video data 203 in buffer 293 and read metadata from the LSBs of chrominance portions of the video data. The least significant bit writer may encode the metadata in such a way so as to avoid unintentional communication of reserved metadata words (by using, for example, 6b/8b or 8b/10b encoding or the like, or defining the reserved words as fixed patterns of consecutive identical bits, etc).

Guard bit readers 284, 294 (and least significant bit readers or writers) may be implemented by a data processor, CPU, microprocessor, FPGA, or any combination thereof, or any other suitable processing unit capable of reading video data to determine luminance levels and comparing such luminance levels to a threshold value. Data writer 286 and metadata reader 296 may be implemented by a data processor, CPU, microprocessor, FPGA, or any combination thereof, or any other suitable processing unit capable of accessing video data 203 from a video data source and writing or reading bits of video data 203.

Where a component (e.g. processor, decoder, encoder, device, display, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments of the invention.

Particular embodiments may be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

While a number of exemplary aspects and embodiments have been discussed above, those of skill in the art will recognize certain modifications, permutations, additions and sub-combinations thereof. For example:

- In certain embodiments, metadata may be carried in a video data stream by embedding the metadata in bits which are not guard bits or LSBs. For example, metadata may be embedded in most significant bits (MSBs), in some embodiments. This may be performed by shifting the existing video data to the right by one bit and placing the metadata in the MSB.
- The example embodiments described herein provide for systems, apparatus and methods useful in a video delivery pipeline. Such systems, apparatus and methods may be useful for delivery of other types of data.
- In example embodiments, metadata is written in video data and transmitted with the video data through the video delivery pipeline. In other embodiments, other kinds of data may be written in video data and transmitted with the video data through the video delivery pipeline.

Metadata written in video data according to the embodiments described herein may be useful in guiding configuration, control and/or operation of other apparatus such as a video archiver, recorder, etc.

It is therefore intended that the following appended claims and claims hereafter introduced are interpreted to include all such modifications, permutations, additions and sub-combinations as are within their true spirit and scope.

Accordingly the invention may suitably comprise, consist of, or consist essentially of, any of element (the various parts or features of the invention and their equivalents as described herein, currently existing, and/or as subsequently developed. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Accordingly, the invention may be embodied in any of the forms described herein, including, but not limited to the following Enumerated Example Embodiments (EEEs) which described structure, features, and functionality of some portions of the present invention.

EEE1 A method of providing video data to a display subsystem, comprising:
 (a) capturing a sequence of video frames to provide video data;
 (b) editing on a reference display an image provided by the video data;
 (c) generating metadata identifying configuration parameters of the reference display and characteristics of the edited image;
 (d) embedding the metadata in the video data;
 (e) delivering the video data including the embedded metadata to the display subsystem;
 (f) extracting the metadata at the display subsystem; and
 (g) configuring the display subsystem or processing the video data for the display subsystem based at least in part on the metadata.

EEE2 A method according to claim 1, wherein embedding the metadata in the video data omprises overwriting a plurality of guard bits in the video data.

EEE3 A method according to claim 2, wherein embedding the metadata in the video data comprises:
 (a) retrieving a bit of metadata from a metadata packet to be delivered;
 (b) locating a first guard bit in the video data;
 (c) comparing a plurality of video bits preceding the first guard bit to a first word indicative of a reserved video word; and
 (d) writing the bit of metadata in the first guard bit if the plurality of video bits preceding the first guard bit differs from the first word.

EEE4 A method according to claim 3, wherein embedding the metadata in the video data comprises setting a guard in the first guard bit if the plurality of video bits preceding the first guard bit matches the first word.

EEE5 A method according to claim 4, wherein if the guard is set in the first guard bit, embedding metadata in the video data comprises:
 (a) locating a second guard bit in the video data which is subsequent to the first guard bit;
 (b) comparing a plurality of video bits preceding the second guard bit to the first word; and
 (c) writing the bit of metadata in the second guard bit if the plurality of video bits preceding the second guard bit differs from the first word.

EEE6 A method according to claim 5, wherein extracting the metadata comprises:
 (a) locating the first guard bit in the video data;
 (b) determining whether the first guard bit contains a guard by comparing the plurality of video bits preceding the first guard bit to the first word; and
 (c) extracting the first guard bit if it is determined that the first guard bit does not contain a guard.

EEE7 A method according to claim 6, wherein if it is determined that the first guard bit contains a guard, extracting the metadata comprises:
 (a) locating the second guard bit in the video data;
 (b) determining whether the second guard bit contains a guard by comparing the plurality of video bits preceding the second guard bit to the first word; and
 (c) extracting the second guard bit if it is determined that the second guard bit does not contain a guard.

EEE8 A method according to claim 1, wherein embedding the metadata in the video data comprises overwriting a plurality of least significant bits (LSB) of chrominance channels in the video data.

EEE9 A method according to claim 8, wherein embedding the metadata in the video data comprises:
 (a) retrieving a bit of metadata from a metadata packet to be delivered;
 (b) locating a first LSB of a chrominance channel in the video data; and
 (d) writing the bit of metadata in the first LSB.

EEE10 A method according to claim 1, wherein embedding the metadata in the video data comprises overwriting a plurality of chrominance bits in the video data for pixels having luminance values below a threshold value.

EEE11 A method according to claim 1, wherein embedding the metadata in the video data comprises:
 (a) identifying one or more black frames in the video data; and
 (b) overwriting a plurality of chrominance bits for pixels in the one or more black frames with the metadata.

EEE12 A method according to claim 1, wherein embedding the metadata in the video data comprises:
 (a) identifying one or more black image areas in the video data; and
 (b) overwriting a plurality of chrominance bits for pixels in the one or more black image areas with the metadata.

EEE13 A method according to claim 1, wherein embedding the metadata in the video data comprises:
 (a) inserting a black frame of video data between a pair of video data frames;
 (b) embedding the metadata in the pixel data of the black frame.

EEE14 A method according to claim 13 comprising, while the metadata in the pixel data of the black frame is extracted at the display subsystem, repeating playback by the display subsystem of a video frame preceding the black frame of video data.

EEE15 A method according to claim 1, wherein delivering the video data including the embedded metadata to a display subsystem comprises:
 (a) receiving new metadata to be transmitted in the video data;
 (b) identifying a priority level of the new metadata;
 (c) identifying a priority level of the embedded metadata;

(d) comparing the priority level of the new metadata with the priority level of the embedded metadata; and
(e) if the priority level of the embedded metadata is lower than the priority level of the new metadata, interrupting delivery of the embedded metadata, and writing the new metadata in the video data.

EEE16. A method according to claim 15, wherein interrupting delivery of the embedded metadata comprises:
(a) extracting the embedded metadata from the video data; and
(b) storing the extracted metadata.

EEE17 A method according to claim 16, comprising resuming transmission of the extracted metadata by rewriting the extracted metadata in the video stream after all of the new metadata has been written in the video data.

EEE18 A method according to claim 1, wherein delivering the video data comprises delivering the video data with the embedded metadata in advance of a video frame for which the embedded metadata is to be applied.

EEE19 A method according to claim 18, wherein the metadata includes a timestamp identifying when the embedded metadata is to be applied.

EEE20 A method according to any one of claims 1 to 19, wherein delivering the video data comprises delivery by one of the following transmission media: DVD, Blu-ray, satellite, cable or Internet.

EEE21 A method according to any one of claims 1 to 20, wherein the metadata is encoded in one of the following formats:
(a) 6b/8b encoding; and
(b) 8b/10b encoding.

EEE22 A method according to any one of claims 1 to 21, wherein the metadata is encoded so that a start of frame header in the metadata is represented by a first fixed pattern of consecutive identical bits and an end of frame header in the metadata is represented by a second fixed pattern of consecutive identical bits.

EEE23 A system comprising:
(a) a video capture subsystem for generating video data;
(b) a post-production subsystem having a reference display and a processor configured to receive and edit the video data generated by the video capture subsystem and display the video data on the reference display; and
(c) a display subsystem having a display and a video processor configured to receive the video data edited by the post-production subsystem and display the video data on the display;
wherein at least one of the video capture subsystem, post-production subsystem and display subsystem is configured to encode metadata in the video data for guiding subsequent processing or display of the video data.

EEE24 A system according to claim 23, wherein the video capture subsystem, post-production subsystem and display subsystem are configured to encode metadata in the video data by embedding metadata in a plurality of guard bits of the video data.

EEE25 A system according to claim 23, wherein the video capture subsystem, post-production subsystem and display subsystem are configured to encode metadata in the video data by embedding metadata in a plurality of least significant bits of the video data.

EEE26 A system according to claim 23, wherein the video capture subsystem, post-production subsystem and display subsystem are configured to encode metadata in the video data by overwriting chrominance data in the video data with the metadata.

EEE27 A system according to claim 24, comprising one or more repositories, each repository storing a list of reserved video words, wherein each of the video capture subsystem, post-production subsystem and display subsystem is configured to locate a next available guard bit in the video data, retrieve the list of reserved video words from one of the repositories and compare the reserved video words to the video data to determine whether to insert a guard in the next available guard bit.

EEE28 A system according to any one of claims 23 to 27, wherein the processor of the post-production subsystem is configured to encode metadata in the video data identifying at least one of:
configuration parameters of the reference display; and
luminance and gamut characteristics of an image provided by the video data.

EEE29 A system according to claim 28, wherein the video processor of the display subsystem is configured to decode metadata in the video data and apply the decoded metadata to configure the display of the display subsystem or process the video data to adjust for characteristics of the display of the display subsystem.

EEE30 A system according to claim 28, wherein the video processor of the display subsystem is configured to read the Extended Display Identification Data of the display of the display subsystem to process the video data to adjust for characteristics of the display of the display subsystem.

EEE31 A system according to any one of claims 23 to 30, wherein the video capture subsystem, post-production subsystem and display subsystem are configured to:
select a method of encoding metadata based at least in part on the video data; and
apply the selected method to encode metadata in the video data for guiding subsequent processing or display of the video data.

EEE32 A system according to any one of claims 23 to 31, wherein the video capture subsystem, post-production subsystem and display subsystem are configured to manage delivery of metadata in the video data so as to allow delivery of relatively lower priority metadata to be interrupted in favour of delivery of relatively higher priority metadata.

EEE33 A system according to any one of claims 23 to 32, wherein the display subsystem is configured to receive video data by way of at least one of the following transmission media: DVD, Blu-ray, satellite, cable or Internet.

EEE34 A system according to any one of claims 23 to 33, wherein the video capture subsystem, post-production subsystem and display subsystem are configured to encode metadata in one of the following formats:
(a) 6b/8b encoding; and
(b) 8b/10b encoding.

EEE35 A system according to any one of claims 23 to 34, wherein the video capture subsystem, post-production subsystem and display subsystem are configured to encode metadata so that a start of frame header in the metadata is represented by a first fixed pattern of consecutive identical bits and an end of frame header in the metadata is represented by a second fixed pattern of consecutive identical bits.

EEE36 A method of encoding metadata in video data, the method comprising:
(a) retrieving a bit of metadata to be carried in the video data;
(b) locating a first guard bit in the video data;
(c) comparing a plurality of video bits adjacent to the first guard bit to a first word indicative of a reserved video word; and, (d) writing the bit of metadata in the first guard bit if the plurality of video bits differs from the first word.

EEE37 A method according to claim 36, wherein encoding the metadata in the video data comprises setting a guard in the first guard bit if the plurality of video bits adjacent to the first guard bit matches the first word.

EEE38 A method according to claim 37, wherein if the guard is set in the first guard bit, encoding metadata in the video data comprises:
(a) locating a second guard bit in the video data which is subsequent to the first guard bit;
(b) comparing a plurality of video bits adjacent to the second guard bit to the first word; and
(e) writing the bit of metadata in the second guard bit if the plurality of video bits adjacent to the second guard bit differs from the first word.

EEE39 A method according to any one of claims 36 to 38, wherein encoding the metadata comprises encoding the metadata in one of the following formats:
(a) 6b/8b encoding; and
(b) 8b/10b encoding.

EEE40 A method according to any one of claims 36 to 39, wherein the metadata is encoded so that a start of frame header in the metadata is represented by a first fixed pattern of consecutive identical bits and an end of frame header in the metadata is represented by a second fixed pattern of consecutive identical bits.

EEE41 A method of extracting metadata from video data, comprising:
(a) locating a first guard bit in the video data;
(b) determining whether the first guard bit contains a guard by comparing a plurality of video bits adjacent to the first guard bit to one or more reserved video words; and
(c) extracting the first guard bit if it is determined that the first guard bit does not contain a guard.

EEE42 A method according to claim 41, wherein if it is determined that the first guard bit contains a guard, extracting the metadata comprises:
(a) locating a second guard bit in the video data which is subsequent to the first guard bit;
(b) determining whether the second guard bit contains a guard by comparing a plurality of video bits adjacent to the second guard bit to the one or more reserved video words; and
(c) extracting the second guard bit if it is determined that the second guard bit does not contain a guard.

EEE43 A method comprising any new and inventive act, step, combination of acts and/or steps or sub-combination of acts and/or steps described herein.

EEE44 An apparatus comprising any new and inventive feature, combination of features or sub-combination of features described herein

The invention claimed is:

1. A method of providing video data to a display subsystem, comprising:
(a) capturing a sequence of video frames to provide video data;
(b) editing on a reference display an image provided by the video data;
(c) generating metadata identifying configuration parameters of the reference display and characteristics of the edited image;
(d) embedding the metadata in the video data, wherein the embedding the metadata in the video further comprises:
(i) retrieving a bit of metadata from a metadata packet to be delivered;
(ii) locating a first guard bit in the video data;
(iii) comparing a plurality of video bits preceding the first guard bit to a first word indicative of a reserved video word; and
(iv) writing the bit of metadata in the first guard bit if the plurality of video bits preceding the first guard bit differs from the first word;
(e) delivering the video data including the embedded metadata to the display subsystem;
(f) extracting the metadata at the display subsystem; and
(g) configuring the display subsystem or processing the video data for the display subsystem based at least in part on the metadata.

2. A method according to claim 1, wherein embedding the metadata in the video data comprises overwriting a plurality of guard bits in the video data.

3. A method according to claim 2, wherein embedding the metadata in the video data comprises setting a guard in the first guard bit if the plurality of video bits preceding the first guard bit matches the first word.

4. A method according to claim 3, wherein if the guard is set in the first guard bit, embedding metadata in the video data comprises:
(a) locating a second guard bit in the video data which is subsequent to the first guard bit;
(b) comparing a plurality of video bits preceding the second guard bit to the first word; and
(c) writing the bit of metadata in the second guard bit if the plurality of video bits preceding the second guard bit differs from the first word.

5. A method according to claim 4, wherein extracting the metadata comprises:
(a) locating the first guard bit in the video data;
(b) determining whether the first guard bit contains a guard by comparing the plurality of video bits preceding the first guard bit to the first word; and
(c) extracting the first guard bit if it is determined that the first guard bit does not contain a guard.

6. A method according to claim 5, wherein if it is determined that the first guard bit contains a guard, extracting the metadata comprises:
(a) locating the second guard bit in the video data;
(b) determining whether the second guard bit contains a guard by comparing the plurality of video bits preceding the second guard bit to the first word; and
(c) extracting the second guard bit if it is determined that the second guard bit does not contain a guard.

7. A method according to claim 1, wherein embedding the metadata in the video data comprises overwriting a plurality of least significant bits (LSB) of chrominance channels in the video data.

8. A method according to claim 7, wherein embedding the metadata in the video data comprises:
(a) retrieving a bit of metadata from a metadata packet to be delivered;
(b) locating a first LSB of a chrominance channel in the video data; and
(c) writing the bit of metadata in the first LSB.

9. A system comprising:
(a) a video capture subsystem for generating video data;
(b) a post-production subsystem having a reference display and a processor configured to receive and edit the video data generated by the video capture subsystem and display the video data on the reference display; and
(c) a display subsystem having a display and a video processor configured to receive the video data edited by the post-production subsystem and display the video data on the display;

wherein at least one of the video capture subsystem, post-production subsystem and display subsystem is configured to encode metadata in the video data for guiding subsequent processing or display of the video data and by embedding metadata in a plurality of guard bits of the video data; and wherein the system further comprises one or more repositories, each repository storing a list of reserved video words, wherein each of the video capture subsystem, post-production subsystem and display subsystem is configured to locate a next available guard bit in the video data, retrieve the list of reserved video words from one of the repositories and compare the reserved video words to the video data to determine whether to insert a guard in the next available guard bit.

10. A system according to claim 9, wherein the video capture subsystem, post-production subsystem and display subsystem are configured to encode metadata in the video data by embedding metadata in a plurality of least significant bits of the video data.

11. A system according to claim 9, wherein the video capture subsystem, post-production subsystem and display subsystem are configured to encode metadata in the video data by overwriting chrominance data in the video data with the metadata.

12. A system according to claim 9, wherein the processor of the post-production subsystem is configured to encode metadata in the video data identifying at least one of:
    configuration parameters of the reference display; and
    luminance and gamut characteristics of an image provided by the video data.

13. A method of extracting metadata from video data, comprising:
    (a) locating a first guard bit in the video data;
    (b) determining whether the first guard bit contains a guard by comparing a plurality of video bits adjacent to the first guard bit to one or more reserved video words; and
    (c) extracting the first guard bit if it is determined that the first guard bit does not contain a guard.

14. A method according to claim 13, wherein if it is determined that the first guard bit contains a guard, extracting the metadata comprises:
    (a) locating a second guard bit in the video data which is subsequent to the first guard bit;
    (b) determining whether the second guard bit contains a guard by comparing a plurality of video bits adjacent to the second guard bit to the one or more reserved video words; and
    (c) extracting the second guard bit if it is determined that the second guard bit does not contain a guard.

* * * * *